United States Patent
Ebisui

(10) Patent No.: US 8,432,561 B2
(45) Date of Patent: Apr. 30, 2013

(54) IMAGE FORMING SYSTEM WITH IMAGE FORMING DEVICE PRIORITIZATION FUNCTION AND METHOD THEREOF

(75) Inventor: Toyoshi Ebisui, Tokyo (JP)

(73) Assignee: Oki Data Corporation, Tokyo (JP)

( * ) Notice: Subject to any disclaimer, the term of this patent is extended or adjusted under 35 U.S.C. 154(b) by 433 days.

(21) Appl. No.: 12/797,049

(22) Filed: Jun. 9, 2010

(65) Prior Publication Data
US 2010/0315665 A1 Dec. 16, 2010

(30) Foreign Application Priority Data

Jun. 12, 2009 (JP) ................................. 2009-141709

(51) Int. Cl.
*G06F 3/12* (2006.01)
(52) U.S. Cl.
USPC ......... 358/1.14; 358/1.13; 358/1.15; 358/1.1; 709/223; 705/30; 705/305; 703/20
(58) Field of Classification Search .................. None
See application file for complete search history.

(56) References Cited

U.S. PATENT DOCUMENTS

| | | | | |
|---|---|---|---|---|
| 6,081,663 | A * | 6/2000 | Takahashi et al. .............. 703/20 |
| 7,996,287 | B2 * | 8/2011 | Hamilton et al. ................ 705/30 |
| 8,214,841 | B2 * | 7/2012 | Amsterdam et al. .......... 718/104 |
| 2002/0026379 | A1 * | 2/2002 | Chiarabini et al. ............. 705/26 |
| 2002/0054330 | A1 * | 5/2002 | Jinbo et al. .................... 358/1.15 |
| 2004/0125385 | A1 * | 7/2004 | Mellor et al. ................... 358/1.1 |
| 2004/0246512 | A1 * | 12/2004 | Miyamoto .................... 358/1.13 |
| 2006/0250638 | A1 * | 11/2006 | Wang et al. ................... 358/1.15 |
| 2008/0174819 | A1 * | 7/2008 | Hada ............................. 358/1.15 |
| 2009/0201531 | A1 * | 8/2009 | Pandit et al. .................. 358/1.15 |
| 2009/0287806 | A1 * | 11/2009 | Hamilton et al. .............. 709/223 |
| 2010/0073705 | A1 * | 3/2010 | Cain ............................. 358/1.15 |
| 2010/0238484 | A1 * | 9/2010 | Komine ........................ 358/1.15 |

FOREIGN PATENT DOCUMENTS

| | | |
|---|---|---|
| JP | A-10-224530 | 8/1998 |
| JP | A-2003-157164 | 5/2003 |
| JP | A-2003-295705 | 10/2003 |
| JP | A-2006-268324 | 10/2006 |
| JP | A-2007-318401 | 12/2007 |

* cited by examiner

*Primary Examiner* — King Poon
*Assistant Examiner* — Ted Barnes
(74) *Attorney, Agent, or Firm* — Posz Law Group, PLC

(57) ABSTRACT

In a system in which a plurality of image forming devices are connected on one or more image processing devices through a network, efficiency of image formation is improved by assigning priority, or by ordering, the image forming devices according to power consumption and wait time. An image forming device is selected according to one of the power consumption and the wait time.

10 Claims, 18 Drawing Sheets

| PRINTER | CONNECTION STATE | OPERATION MODE | PRINT WAIT TIME | POWER CONSUMPTION | JOB HISTORY | LAST INFORMATION ACQUISITION TIME |
|---|---|---|---|---|---|---|
| PRINTER A | ONLINE | PRINT | 20 sec | 400 | YES | * |
| PRINTER B | ONLINE | STANDBY | 60 sec | 300 | YES | * |
| PRINTER C | ONLINE | SLEEP | 20 sec | 400 | NO | * |
| PRINTER D | ONLINE | SLEEP | 60 sec | 300 | YES | * |
| ⋮ | ⋮ | ⋮ | ⋮ | ⋮ | ⋮ | ⋮ |
| PRINTER N | ONLINE | — | — | — | — | * |

Fig. 10

| OPERATION MODE | PRINT | STANDBY | SLEEP | NO CONNECTION |
|---|---|---|---|---|
| POWER CONSUMPTION (W) | 400 | 60 | 10 | 500 |
| PRINT WAIT TIME | PRINT JOB REMAINING TIME | 20 sec | 60 sec | — |

| ITEM | LOW POWER CONSUMPTION ORDER | PRINT WAIT TIME ORDER | PRINT JOB POWER CONSUMPTION (W) | PRINT WAIT TIME (sec) | PRINT JOB ELAPSE TIME (min) | POWER CONSUMPTION (W) | | | PRINT WAIT TIME (sec) | | | DDT (min) |
|---|---|---|---|---|---|---|---|---|---|---|---|---|
| OPERATION MODE | | | | | | PRINT | STAND-BY | SLEEP | PRINT | STAND-BY | SLEEP | |
| PRINTER A / PRINT | 2 | 1 | | 20 (JOB REMAINING TIME) | — | 400 | 60 | 10 | 10 | 20 | 30 | 30 |
| PRINTER B / STANDBY | 2 | 2 | 400 | 30 | WITHIN 15 | 400 | 60 | 5 | 10 | 30 | 60 | 15 |
| PRINTER C / SLEEP | 2 | 3 | 400 | 40 | 5 | 400 | 30 | 1 | 10 | 40 | 120 | 5 |
| PRINTER D / SLEEP | 1 | 4 | 200 + 40 | 120 | 60 | 200 | 40 | 1 | 10 | 30 | 120 | 5 |

Fig. 12B

| ITEM | LOW POWER CONSUMPTION ORDER | PRINT WAIT TIME ORDER | PRINT JOB POWER CONSUMPTION (W) | PRINT WAIT TIME (sec) | PRINT JOB ELAPSE TIME (min) | POWER CONSUMPTION (W) | | | PRINT WAIT TIME (sec) | | | DDT (min) |
|---|---|---|---|---|---|---|---|---|---|---|---|---|
| OPERATION MODE | | | | | | PRINT | STAND-BY | SLEEP | PRINT | STAND-BY | SLEEP | |
| PRINTER A / PRINT | 2 | 2 | | 40 (JOB REMAINING TIME) | — | 400 | 60 | 10 | 10 | 20 | 30 | 30 |
| PRINTER B / STANDBY | 2 | 1 | 400 | 20 | WITHIN 15 | 400 | 60 | 5 | 10 | 30 | 60 | 15 |
| PRINTER C / SLEEP | 2 | 2 | 400 | 40 | 5 | 400 | 30 | 1 | 10 | 40 | 120 | 5 |
| PRINTER D / SLEEP | 1 | 3 | 200 + 40 | 120 | 60 | 200 | 40 | 1 | 10 | 30 | 120 | 5 |

| PRINTER NAME | NETWORK CONNECTION | JOB COMPLETION | REMAINING JOB | OPERATION MODE | LOW POWER CONSUMPTION ORDER | PRINT WAIT TIME ORDER |
|---|---|---|---|---|---|---|
| PRINTER A | CONNECTED | 0 | 1 | PRINT | 1 | 2 |
| PRINTER B | CONNECTED | 1 | 0 | STANDBY | 2 | 1 |
| PRINTER C | CONNECTED | 2 | 0 | SLEEP | 3 | 3 |
| PRINTER D | NO CONNECTION | 0 | 0 | x | x | x |

Fig. 13A

| PRINTER NAME | STATE | JOB COMPLETION | REMAINING JOB | LOW POWER CONSUMPTION ORDER | PRINT WAIT TIME ORDER |
|---|---|---|---|---|---|
| PRINTER A | PRINT | 0 | 1 | 1 | 2 |
| PRINTER B | STANDBY | 1 | 0 | 2 | 1 |
| PRINTER C | SLEEP | 2 | 0 | 3 | 3 |
| PRINTER D | NO CONNECTION | 0 | 0 | x | x |

Fig. 13B

IMAGE FORMING SYSTEM WITH IMAGE FORMING DEVICE PRIORITIZATION FUNCTION AND METHOD THEREOF

CROSS REFERENCE

The present application is related to, claims priority from and incorporates by reference Japanese patent application number 2009-141709, filed on Jun. 12, 2009.

BACKGROUND

The present invention relates to an image forming system that has an information processing device outputting a print job and that has an image forming device in which an image is formed in accordance with the print job received from the information processing device through a network. Also, the present invention relates to an image forming method of the image forming system.

A conventional image forming system has a power management server that manages power consumption of and controls performance of each of a plurality of printers connected to the network. Before the printer executes its operation, the printer requests power usage from the power management server. After the printer receives permission for the power usage from the power management server, the print operation is started. For example, such a system is disclosed in paragraphs [0032]-[0039] and FIG. 11 of Japanese laid-open patent application publication number 2006-268324.

SUMMARY

However, in the conventional technologies, when the print operation is performed, priority is given to a printer with low power consumption. However, in this case, there is a problem in which the duration of the wait time before starting the print operation is unexpectedly long. The priority between power consumption and the duration of the wait time before starting the print operation is changed from moment to moment according to a situation of a user who tries to print at a printer. Therefore, it is not always preferred that the priority order is uniformly set despite the user's intention.

An object of the present invention is to provide an image forming system in which an image forming device to perform an image forming operation can be selected by prioritizing one of low power consumption and the duration of the wait time for starting image forming operation.

Accordingly, the present application discloses an image forming system in which a plurality of image forming devices, which form an images by receiving an image forming instruction, and an information processing device, which sends the image forming instruction to the image forming devices, communicate with each other. Each of the image forming devices includes a memory module that stores an operation mode showing a state of the device and that stores power consumption information of the operation mode in advance. The information processing device includes an acquisition module that acquires the operation mode and the power consumption information stored in the memory module of each of the image forming devices; an order determination module that assigns a power consumption order to each of the image forming devices according to power consumption based on the operation mode, that calculates image forming wait time from the time of receiving the image forming instruction at each of the image forming devices based on the operation mode to the time of starting an image forming operation, and that assigns an image forming wait time order to each of the image forming devices according to image forming wait time; and a display device that displays the power consumption order and the image forming wait time order of each of the image forming devices assigned by the order determination module.

In another aspect, the present application discloses a method of forming images with improved efficiency, wherein each of a plurality of image forming devices forms an image by receiving an image forming instruction from an information processing device, which sends the image forming instruction to the image forming devices through a network. The method includes: storing operation modes and power consumption information corresponding to the operation modes in the image forming devices in advance; and acquiring a current operation mode and power consumption information from each of the image forming devices; determining a power consumption order to each of the image forming devices according to power consumption based on the current operation mode; determining image forming wait times for each of the image forming devices, which is a delay time from the time of receiving the image forming instruction at each of the image forming devices based on the operation mode to the time of starting an image forming operation; and assigning an image forming wait time order to each of the image forming devices according to the image forming wait time; and selecting one image forming device to which the image forming instruction is to be sent among the plurality of image forming devices based on one of the power consumption order and the image forming wait time order.

Therefore, the present invention can achieve effects in which it is possible to select an image forming device that forms an image by prioritizing one of low power consumption and the duration of the wait time for starting image forming operation.

BRIEF DESCRIPTION OF THE DRAWINGS

FIG. 10 is a table of an operation information list according to the first embodiment.

FIG. 11 is a table of a default information list according to the first embodiment.

FIGS. 12A and 12B are tables of an operation information management list according to the first embodiment.

FIGS. 13A and 13B are tables of an information list according to the first embodiment.

DETAILED DESCRIPTION (First Embodiment)

In FIG. 1, the image forming system is configured with one or a plurality of host computers 1 (for example, host computer A, host computer B, and host computer C) as information processing devices, a plurality of printers 2 (for example, printer A, printer B, and printer C), and a network 3 as a communication line that communicatively connects between the host computers 1 and the printers 2.

Figure 1:
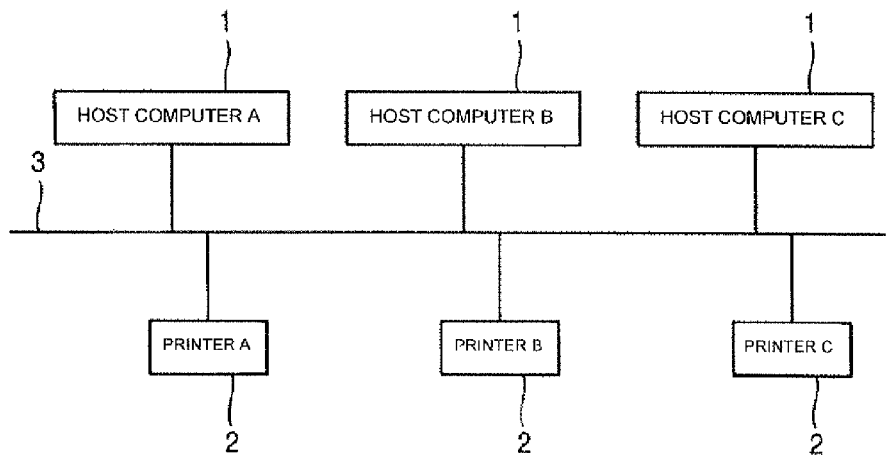
FIG. 1 is a block diagram of a configuration of an image forming system according to a first embodiment.

Each host computer 1 is generally a personal computer in which several software applications, such as document creation software, are installed individually. Image data as a print job for an image forming instruction that is formed by the software is sent to the printer 2.

Each printer 2 prints an image (performs image forming) on a recording sheet based on a print job received from one of the host computers 1 and outputs the print job. In the present embodiment, each printer 2 is an electrographic printer.

Each host computer 1 and each printer 2 establish communication through the network 3 according to a normal communication protocol procedure. Each host computer 1 sends the print job to one of the printers 2 (printer A, printer B, and printer C).

Each host computer 1 sends an operation information request command to acquire operation information showing an operation state of the printers 2. When the printers 2 receive the operation information request command, each printer 2 replies to the host computer 1 with the operation information as a response to the operation information request command.

Figure 2:
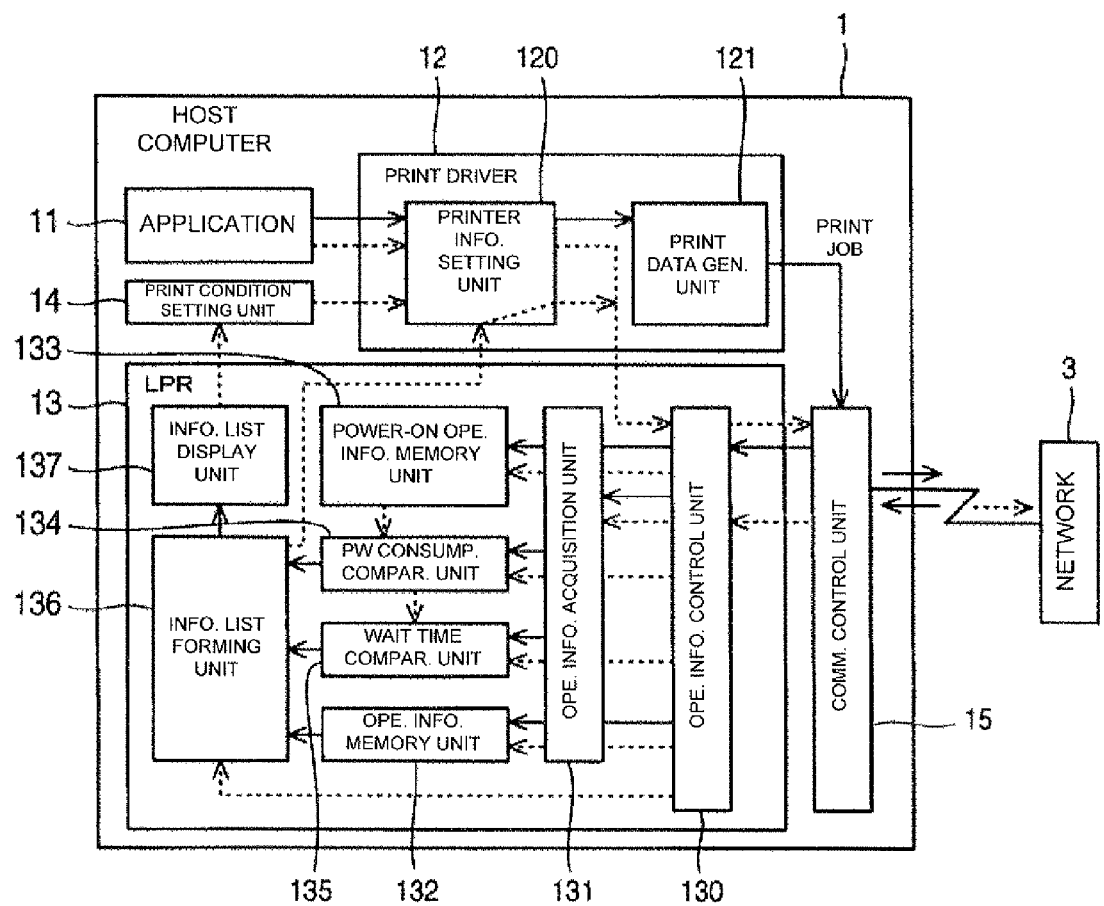
FIG. 2 is a block diagram of a configuration of a host computer according to the first embodiment.

FIG. 2 is a block diagram of a configuration of a host computer 1 according to the first embodiment. The configuration of each host computer 1 (host computers A, B, and C shown in FIG. 1) that performs print jobs, sends operation information request commands, receives operation information, and so on with the printers 2 is shown. Although FIG. 2 shows only one host computer 1, the configuration of FIG. 2 applies to each of the plurality of host computers 1. Further, the description below of the host computer 1 of FIG. 2 applies to each of the host computers 1 of FIG. 1, even though the singular form may be used in connection with FIG. 2.

In FIG. 2, the host computer 1 is configured with application software (herein after, referred as application) 11, such as document creation software, a print driver 12 generating print data, a line printer daemon protocol (LPR) network utility software 13 serving as a connection management program for the printer 2, a print condition setting unit 14, and a communication control unit 15.

The printer driver 12 is software to generate print data that enables printing of image data formed by the application 11 through a printer. Printer drivers 12 are provided and correspond to each of the printers (printers A, B, and C in FIG. 1), respectively. Operation setting items of the print drivers 12 can be changed with respect to each of the printers. Operation setting information is stored in memory units that are assigned to each of the printer drivers 12.

The printer driver 12 is configured with a printer information setting unit 120 that sets operation items of the printer, and a print data generation unit 121 for generating print data.

In the application 11, when printing is performed, the printer driver 12 that is assigned by an operator's operation is selected at first in print initiation. The application 11 writes operation setting item information into the printer information setting unit 120 by a control command to set the operation settings for the printer driver 12.

The application 11 concurrently sends image data to the print data generation unit 121 through the printer information setting unit 120. The print data generation unit 121 generates print job data in a printable format by the printer based on the sent image data and sends the generated print job data to the network 3 through the communication control unit 15.

The LPR 13 is a connection management program for a plurality of printers connected to the network 3 and has functions of network settings, operation settings, operation state display, and other settings for each of the printers 2. FIG. 2 shows a structure for realizing the functions according to the present embodiment.

The LPR 13 is configured with an operation information control unit 130, an operation information acquisition unit 131, an operation information memory unit 132, or memory module, a power-on operation information memory unit 133, a power consumption comparison unit 134, a wait time comparison unit 135, an information list forming unit 136, and an information list display unit 137.

In order to acquire operation information for a printer (not shown) that is connected to the network 3, the operation information memory unit 132, which serves as an acquisition module, sends a printer control command to the network 3 by sending it to the communication control unit 15 through the operation information control unit 130. The printer control command that is sent to the network 3 instructs the printer to send operation information.

The operation information is printer information that includes an operation mode, print wait time, power consumption, job history, sleep elapsed time, wait elapsed time, and default delay to a sleep mode (DDT).

The operation mode is information showing the operation state of the printer, and the operation modes include the following four modes: (1) an online mode (state of receiving print data), (2) a standby mode (state of waiting for a print job is while the fuser maintains the print temperature), (3) a print mode (printing of a received print job is performed while the fuser maintains the print temperature), and (4) a sleep (low power consumption) mode (minimum power consumption state in which the printer waits for a print job while power consumption is decreased by disconnecting the power for the fuser among other things).

The print wait time is a standard time period from the time a print job is received until printing is started in each of the operation modes.

The power consumption is the power consumption of a printer in each of the operation modes.

The print wait time and the power consumption are stored in the memory unit of each printer as shown in, for example, FIG. 11. FIG. 11 shows a standard value in each operation mode as a default information list.

The job history shows whether or not a print operation has been performed by receiving a print job after the power of the printer was turned on.

The sleep elapsed time is the time that elapsed after the printer shifted to the sleep mode.

Shift time to the sleep mode is the duration of time between finishing a print operation of the printer and shifting to the sleep mode.

The operation information received from the printer is inputted to the operation information control unit 130 through the communication control unit 15 and is stored in the operation information memory unit 132.

The operation information memory unit 132 sequentially stores operation information of the plurality of printers connected to the network 3. Power consumption information, print wait time information, and so on of each of the printers 2 are stored in the operation information memory unit 132. For example, as shown in FIG. 10, connection state, operation mode, print wait time, power consumption, job history, last information acquisition time, and so on are stored as an operation information list.

The power consumption information and the print wait time information of the operation information stored in the operation information memory unit 132 are sent to the information list forming unit 136 through the power consumption comparison unit 134 and the wait time comparison unit 135, respectively.

The information list forming unit 136, which serves as an order determination module, orders the printers 2 in ascending order of power consumption based on the operation mode, the power consumption information, and so on of the operation information for the plurality of the printers 2 connected to the network 3. The information list forming unit 136 also orders the printers in ascending order of the print wait time based on the operation mode, the print wait time information, and so on of the operation information so that an operation information management list is formed. Details of the process of ordering of the printers in ascending order of power consumption and in ascending order of the print wait time are discussed later.

As shown in FIGS. 12A and 12B, the operation information management list is configured with the operation mode, the low power consumption order, the print wait time order, print job power consumption, print wait time, print job elapsed time, standard values of power consumption and the print wait time in each operation mode, DDT, and so on for each of the printers 2. FIG. 12 A shows that the time until finishing the print job of a printing printer A (job remaining time) is shorter than the print time of a standby printer B. FIG. 12B shows that the duration of the time until finishing the print job of the printing printer A (job remaining time) is longer than print time of the standby printer B.

The information list display unit 137, which serves as a display device, displays the formed ordering as an information list on a display or the like. As shown in FIG. 13A, the information list is configured with, for example, network connection status (connected/unconnected), the number of print jobs completed, the number of remaining print jobs, operation mode, low power consumption order, print wait time order, and so on for each of the printers 2. As shown in FIG. 13B, the information list may be configured with state information showing the network connection state and operation mode, the number of completed print jobs, the number of remaining print jobs, an operation mode, low power consumption order, print wait time order, and so on for each of printers 2.

The following is an explanation of updating the information list that is formed by the information list forming unit 136.

It is necessary to periodically update the contents of the information list that is displayed by the information list display unit 137. Especially, consumed power is minimized when all the operation states of the printers 2 connected to the network are shifted to sleep states (power saving mode). Then, as time passes, the temperature of the respective fusers reaches a stationary state so that the printers are in an initial state.

The operation information control unit 130 periodically updates the contents of the information list that is formed by the information list forming unit 136. The operation information control unit 130 sends a printer control command to the communication control unit 15. Then, the printer control command is sequentially sent to the plurality of printers 2 connected to the network. As a reply, the operation information control unit 130 receives operation information and updates the information list.

Power consumption information stored in the operation information memory unit 132 is compared with new power consumption information, which is acquired at the time of updating the information list, by the power consumption comparison unit 134 and is sent to the information list forming unit 136. The information list forming unit 136 forms an information list of power consumption showing the order of printers in ascending order of power consumption based on the operation mode, the power consumption information, and so on. The information list display unit 137 displays the formed information list of power consumption at a display or the like.

Similarly, print wait time information stored in the operation information memory unit 132 is compared with new print wait time information, which is acquired at the time of updating the information list, by the wait time comparison unit 135 and is sent to the information list forming unit 136. The information list forming unit 136 forms an information list of print wait times showing the order of printers in which wait time is short based on the operation mode, the print wait time information, and so on. The information list display unit 137 displays the formed information list of print wait time at a display or the like.

The entire operation of the host computer 1 configured with the structures discussed above is controlled by a control unit (not shown) as a control device and calculating device based on a control program (software) stored in a memory unit, or memory (not shown). The control unit also has a timing device that measures the elapse of time.

Figure 3:
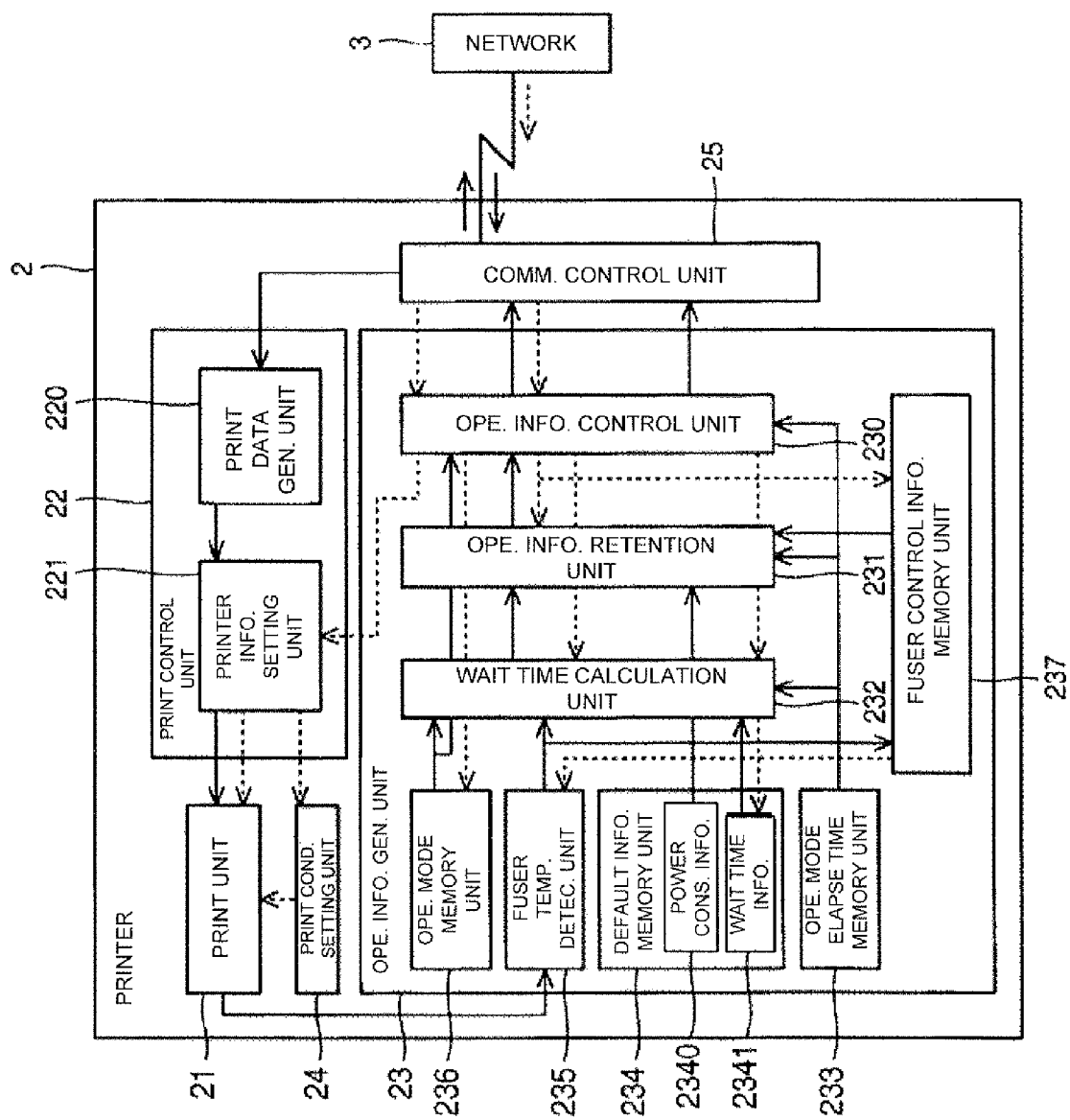
FIG. 3 is a block diagram of a configuration of a printer according to the first embodiment.

FIG. 3 is a block diagram of the configuration of a printer according to a first embodiment. The configuration of each of the printers 2 (printers A, B, and C shown in FIG. 1) that perform print jobs, operation information request commands, send operation information, and so on with the host computers discussed above is shown. Although FIG. 3 shows only one printer, the configuration of FIG. 3 applies to each of the printers 2. Further, the description below refers to each of the printers 2, even though the singular form may be used in connection with FIG. 3.

In FIG. 3, the printer 2 is configured with a print unit 21, a printer control unit 22, an operation information generation unit 23, a print condition setting unit 24, and a communication control unit 25.

In the printer 2, a print job output from a host computer on the network 3 is received by the internal communication control unit 25 and is sent to the printer control unit 22 through the communication control unit 25. A print data generation unit 220 of the printer control unit 22 generates image data as print data and image setting information based on the received print job.

The image data is sent to the print unit 21 through a printer information setting unit 221 with condition setting. The image setting information is sent to the print unit 21 through the print condition setting unit 24 with condition setting. The print unit 21 prints based on the print data and the image setting information that are sent to the print unit 21. As discussed above, the printer 2 prints print job data as image data.

The operation information generation unit 23 of the printer 2 is configured with an operation information control unit 230, an operation information retention unit 231, a wait time calculation unit 232, an operation mode elapsed time memory unit 233, a default information memory unit 234, a fuser temperature detection unit 235, an operation mode memory unit 236, and a fuser control information memory unit 237. The operation information generation unit 23 generates operation information that is stored in the operation information memory unit 132 of the LPR 13 shown in FIG. 2.

The operation mode memory unit 236 stores a current operation state of the printer 2. Specifically, it stores the operation state in the one of the following four modes: an online mode, a standby mode, a print mode, and a sleep mode.

The print unit 21 has a temperature detection device, such as a sensor, that detects the temperature of a fuser that fuses toner transferred on a recording sheet by thermal melting. The current temperature of the fuser is detected at a fuser temperature detection unit 235 of the operation information generation unit 23.

The default information memory unit 234 stores power consumption information 2340 and print wait time information 2341 in advance. The power consumption information 2340 and the print wait time information 2341 are configured with standard values of power consumption and print wait time in each operation mode and are shown as an exemplary default information list in FIG. 11.

The fuser control information memory unit 237 stores existence or nonexistence of fuser control. When temperature of the fuser is maintained at print temperature in a standby mode, the fuser control information memory unit 237 stores "nonexistence" of fuser control. On the other hand, when the temperature of the fuser is lower than the print temperature, the fuser control information memory unit 237 stores "existence" of fuser control. In the present embodiment, because the temperature of the fuser is maintained at the print temperature in the standby mode, the fuser control information memory unit 237 stores "nonexistence" of fuser control. However, after certain period of time passes in the standby mode, the temperature of the fuser is scheduled to be lower than the print temperature, and then the fuser control information memory unit 237 may store "existence" of fuser control.

Figure 5:
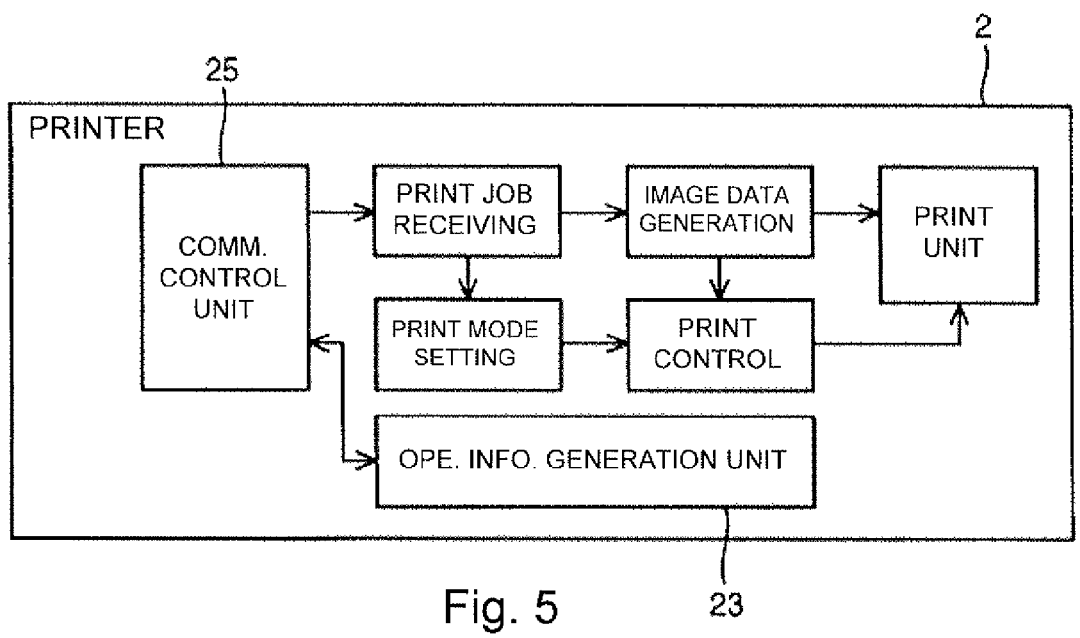
FIG. 5 is a block diagram of operation of a printer according to the first embodiment.

Next, an operation in which a host computer acquires operation information from a printer is explained based on a block diagram showing the operation of a host computer 1 according to the first embodiment and block diagrams showing operation of a printer 2 according to the first embodiment in FIGS. 3 and 5.

Figure 4:
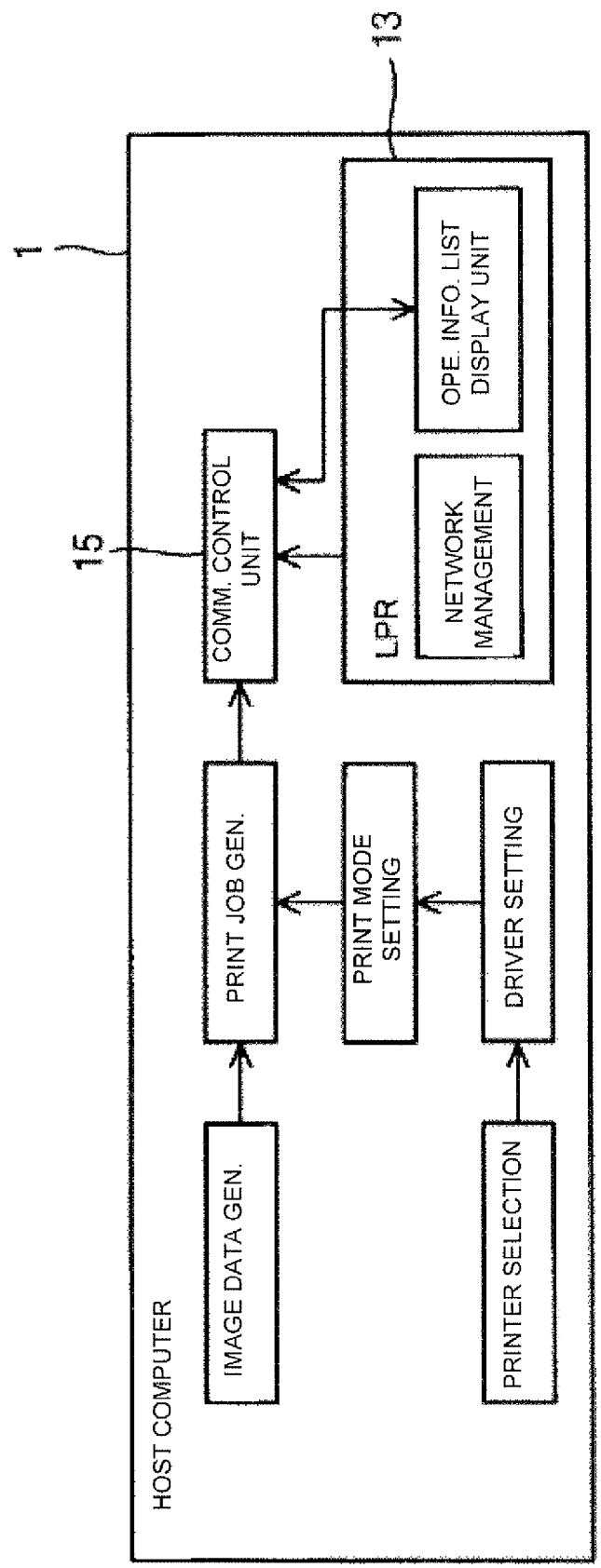
FIG. 4 is a block diagram of operation of a host computer according to the first embodiment.

In FIG. 4, the LPR 13 of the host computer 1 sends a printer control command to the network 3 by sending the printer control command to the communication control unit 15 in order to acquire operation information containing power consumption information and print wait time information of a printer (not shown) connected to the network 3.

In FIGS. 3 and 5, the communication control unit 25 of the printer 2 receives the printer control command that is sent to the network 3 by the host computer 1. The communication control unit 25 determines whether or not the received printer control command is a printer control command that requires operation information. When the communication control unit 25 determines that the received printer control command is a printer control command that requires operation information, the communication control unit 25 sends the printer control command to the operation information control unit 230 of the operation information generation unit 23.

The operation information control unit 230 confirms the current device condition to the operation mode memory unit 236 of the operation information generation unit 23 and stores power consumption information that corresponds to the confirmed operation mode in the operation information retention unit 231. Further, the operation information control unit 230 stores the elapsed time after the time of shifting to the operation mode as elapsed time information into the operation mode elapsed time memory unit 233.

On the other hand, the temperature of the fuser that is detected by the fuser temperature detection unit 235 is inputted to the wait time calculation unit 232 that calculate print wait time. The wait time calculation unit 232 calculates the temperature difference between the input temperature of the fuser and the temperature of the fuser that is required to print. Then, the wait time calculation unit 232 calculates print wait time by a calculation that is set in advance. The wait time calculation unit 232 temporarily stores the calculated print wait time in the operation information retention unit 231.

The operation information control unit 230 generates operation information based on the operation mode stored in the operation information retention unit 231, power consumption information, print wait time information, elapsed time information, and so on and sends the operation information to the host computer in the network through the communication control unit 25 as a response to the printer control command.

The entire operation of the printer 2 configured with the structures discussed above is controlled by a control unit (not shown) as a control device and calculating device based on a control program (software) stored in a memory unit, such as a memory (not shown). The control unit also has a timing device that measures the elapse of time.

The operation of the structures discussed above is explained below.

Figure 6:
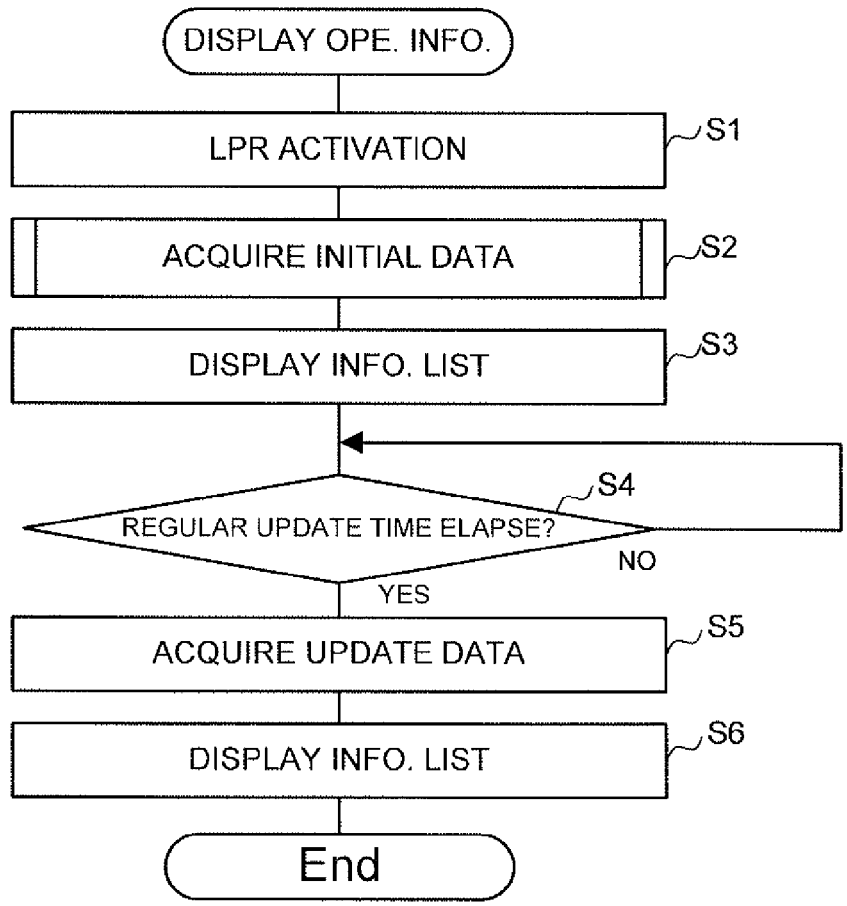
FIG. 6 is a flow diagram showing operation information display processing of a line printer daemon protocol (LPR) according to the first embodiment.

Display processing of operation information that is performed by an LPR 13 of a host computer 1 is explained according to Step S in a flow diagram showing operation information display processing of the LPR of the present embodiment in FIG. 6 with reference to FIG. 2.

At S1, a host computer 1 is activated so that an LPR 13 is activated.

At S2, the host computer 1 acquires operation information as initial data from each printer connected to the network 3.

At S3, the host computer 1 displays an information list that is formed based on the initial data of acquired operation information at an information list display unit 37.

As shown in FIG. 13A, the displayed information list is configured with, for example, a network connection (connected/unconnected), the number of print jobs completed, the number of remaining print jobs, the operation mode, the low power consumption order, and the print wait time order for each of the printers 2. As shown in FIG. 13B, the information list may include a state showing the state of the network connection (connected/unconnected) and the operation mode, the number of print jobs completed, the number of remaining print jobs, the low power consumption order, and the print wait time order for the printers 2.

At S4, the host computer 1 monitors the elapse of predetermined time.

At S5, when the host computer 1 detects the elapse of the predetermined time, the host computer 1 acquires operation information as update data from a printer 2 connected to the network 3.

At S6, the host computer 1 displays an information list that is formed based on the updated data of acquired operation information at the information list display unit 37.

Then, the host computer 1 repeats the processing from S4 through S6 and displays an information list that is formed based on the updated data of acquired operation information at the information list display unit 37.

Figure 7:
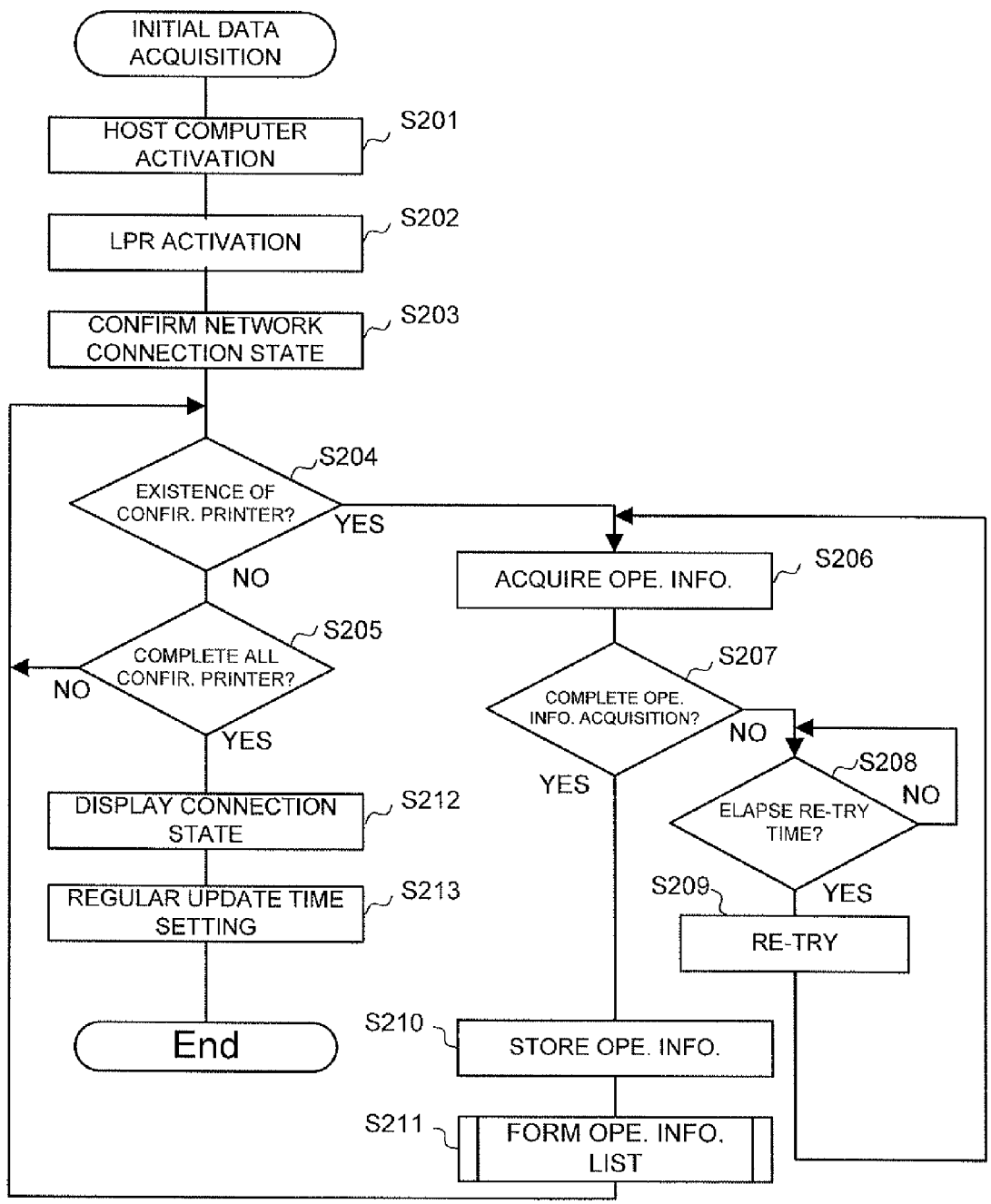
FIG. 7 is a flow diagram showing initial data acquisition processing of an LPR according to the first embodiment.

Next, initial data acquisition processing (S2 in FIG. 6) of operation information that is performed by the LPR 13 of the host computer 1 is explained according to Step S in a flow diagram showing the initial data acquisition processing of the LPR 13 of the present embodiment in FIG. 7 with reference to FIG. 2.

At S201 and S202, when the host computer is activated, the LPR 13 that is already installed is activated.

At S203, the activated LPR 13 confirms the existence of a printer that is connected to the network 3.

At S204 and S205, when the LPR 13 confirms existence of a printer connected to the network 3 and when the LPR determines that acquisition of operation information is not completed, processing goes to S206. When LPR determines that acquisition of operation information of all printers connected to the network 3 is completed, processing goes to S212.

At S206, the LPR 13 acquires operation information from a printer for which the connection is confirmed.

At S207, when the LPR 13 acquires operation information from the printer, processing goes to S210. When the LPR 13 cannot acquire operation information from the printer, processing goes to S208.

At S208, when operation information cannot be acquired from the printer, the host computer 1 stands by for the elapse of a predetermined re-try cycle time.

At S209, when the re-try cycle time is elapsed, processing goes to S206. Then, the host computer 1 tries again to acquire operation information from the printer.

At S210, after the LPR 13 acquires operation information from the printer, the acquired operation information is stored in the operation information memory unit 132.

At S211, the information list forming unit 36 of the LPR 13 forms an operation information list based on the operation information stored in the operation information memory unit 132. Processing goes to S204. And then, the LPR 13 acquires operation information of other printers 2.

When the number of re-tries has exceeded the predetermined number in S209, the LPR 13 determines that operation information acquisition is not possible and displays it in the operation information list.

At S212 (S3 in FIG. 6), Operation information acquisition of all printers (printer A, printer B, and printer C in the present embodiment) connected to the network 3 is completed, the LPR 13 makes an information list containing operation information in each printer connected to the network 3 and displays it at the information list display unit 37.

At S213, the LPR 13 sets the duration of time to the next regular update for operation information and finishes the initial data acquisition processing for operation information.

Figure 8:
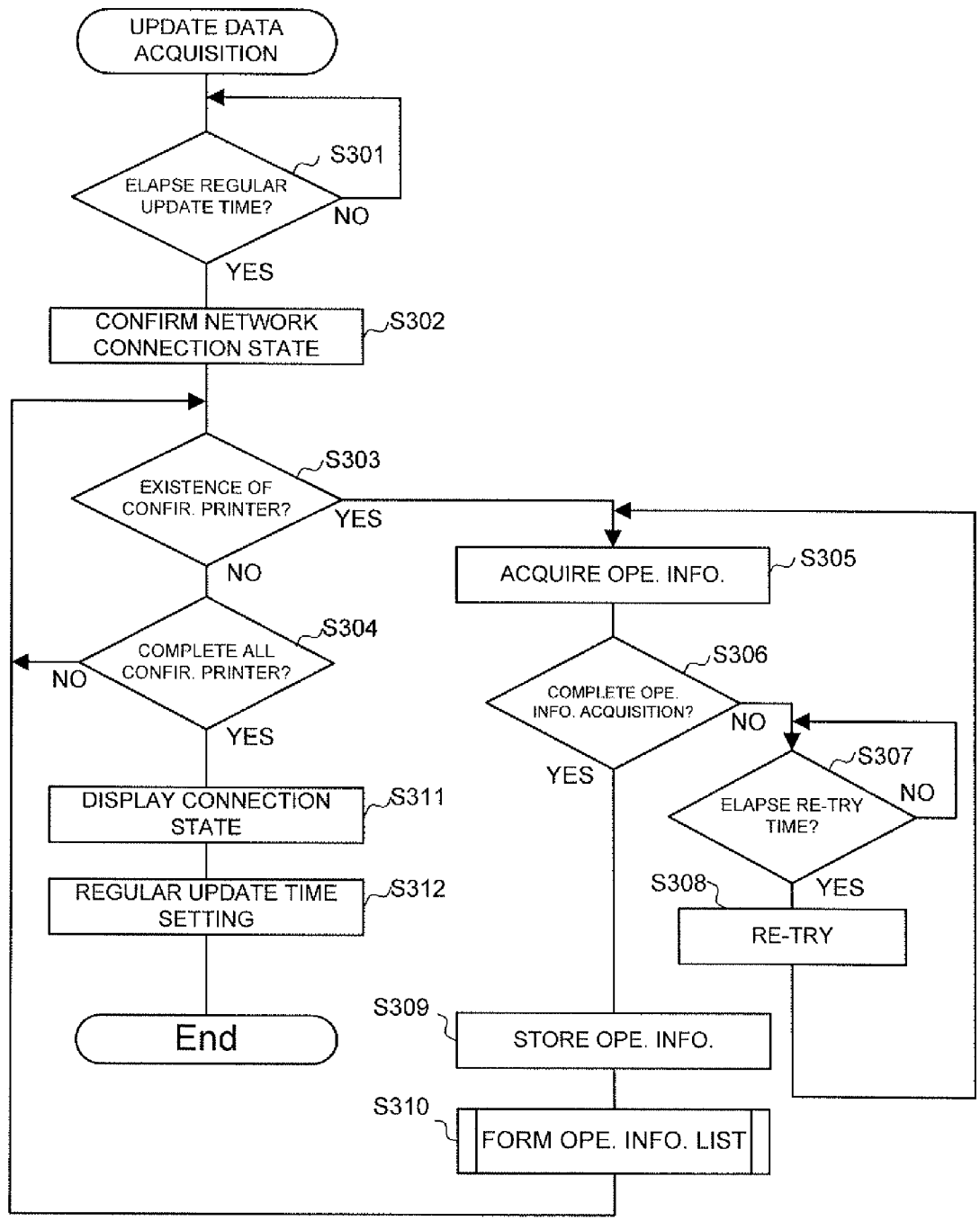
FIG. 8 is a flow diagram showing update data acquisition processing of an LPR according to the first embodiment.

Next, update data acquisition processing (S5 in FIG. 6) of operation information that is periodically performed by the LPR 13 of the host computer is explained according to Step S in a flow diagram showing the update data acquisition processing of the LPR 13 of the present embodiment in FIG. 8 with reference to FIG. 2.

At S301 (S4 in FIG. 4), the LPR 13 of the host computer 1 stands by for the elapse of time for a regular update of operation information. When the time for a regular update is elapsed, processing goes to S302. When changes of an operation mode, sleep elapsed time, wait elapsed time, and so on of a printer connected to the network have occurred, update data of operation information is generated.

At S302, the LPR 13 confirms the existence of a printer that is connected to the network 3.

At S303 and S304, when the LPR 13 confirms existence of a printer connected to the network 3 and when the LPR 13 determines that acquisition of operation information is not completed, processing goes to S305. When the LPR 13 determines that acquisition of operation information of all printers 2 connected to the network 3 is completed, processing goes to S311.

At S305, the LPR 13 acquires operation information as update information from a printer 2 for which the connection is confirmed.

At S306, when the LPR 13 acquires operation information from the printer 2, processing goes to S309. When the LPR 13 cannot acquire operation information from the printer 2, processing goes to S307.

At S307, when operation information cannot be acquired from the printer 2, the host computer 1 stands by for the elapse of a predetermined re-try cycle time.

At S308, when the re-try cycle time is elapsed, processing goes to S305. Then, the host computer 1 attempts again to acquire operation information from the printer 2.

At S309, the acquired operation information is stored into the operation information memory unit 132 by the LPR 13.

At S310, the information list forming unit 36 of the LPR 13 forms an operation information list based on the operation information stored in the operation information memory unit 132. Processing goes to S303. And then, the LPR 13 acquires operation information of other printers 2.

When the number of re-try is exceeded the predetermined number in S308, the LPR 13 determines that operation information acquisition is not possible and displays it in the operation information list.

At S311 (S6 in FIG. 6), Operation information acquisition of all printers 2 (printer A, printer B, and printer C in the present embodiment) connected to the network 3 is completed, the LPR 13 makes an information list containing operation information in each printer 2 connected to the network 3 and displays it at the information list display unit 37.

At S312, the LPR 13 sets the duration of time to the next regular update for operation information and finishes the update data acquisition processing for operation information.

Figure 9:
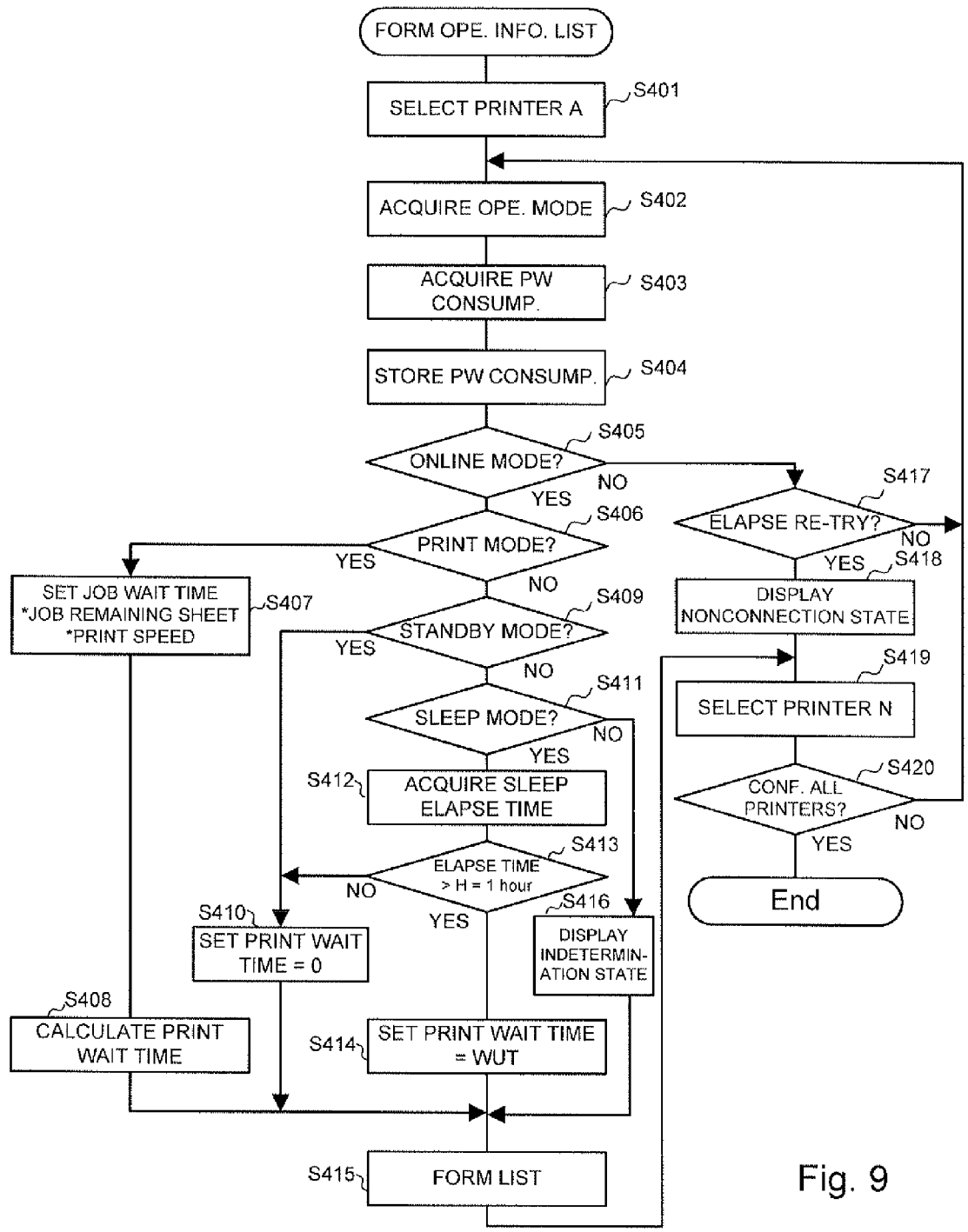
FIG. 9 is a flow diagram showing operation information list forming processing of an LPR according to the first embodiment.

Next, operation information list forming processing (S211 in FIG. 7 and S310 in FIG. 8) that is performed by the LPR 13 of the host computer 1 is explained according to Step S in a flow diagram showing the operation information list forming processing of the LPR 13 of the present embodiment in FIG. 9 with reference to FIG. 2.

At S401, the LPR 13 of the host computer 1 selects a printer 2 connected to the network 3. In the present embodiment, the LPR 13 first selects a printer A.

At S402, the LPR 13 acquires an operation mode of the selected printer A from operation information stored in the information memory unit 132 shown in FIG. 2.

At S403, the LPR 13 acquires power consumption stored in the information memory unit 132 by corresponding to the acquired operation mode.

At S404, the LPR 13 stores the acquired power consumption into a memory unit.

At S405, the LPR 13 confirms the acquired operation mode. When the operation mode is the online mode, processing goes to S406. When the operation mode is not the online mode, processing goes to S417.

At S406, the LPR 13 confirms the operation mode. When the operation mode is the print mode, processing goes to S407. When the operation mode is not the print mode, processing goes to S409.

At S407, in the print mode, the LPR 13 calculates time to finish a print job in print processing as job wait time. The job wait time is calculated by the following formula, job remaining sheets (pages)×print speed (sec/page). Note that the LPR 13 acquires a print speed from each printer 2 connected to the network at the time of activation of the LPR 13.

At S408, the LPR 13 sets the job wait time as print wait time. Then, processing goes to S415.

At S409, the LPR 13 confirms the operation mode. When the operation mode is a standby mode, processing goes to S410. When the operation mode is not the standby mode, processing goes to S411.

At S410, the LPR 13 sets the print wait time as "0." Then, processing goes to S415. In the present embodiment, the standby mode is defined as a state in which a fuser stands by to maintain a normal print temperature. However, when certain period of time is elapsed in the standby mode, and when the fuser stands by to maintain a lower temperature than the print temperature, it is possible to do the following.

The LPR 13 acquires standby elapsed time that is the elapsed time in the standby mode from operation information. Then, the LPR 13 sets the fuser temperature, which is the current temperature of the fuser based on the acquired standby elapsed time.

Next, the LPR 13 compares the set fuser temperature with the standby temperature. When the fuser temperature is equal to or lower than the standby temperature, the LPR 13 calculates the time to increase the fuser temperature to the print temperature, at which printing can be started, as print wait time. And then, processing goes to S415. The print wait time is calculated with the difference between the fuser temperature and the print temperature of a printer known in advance at which printing can be started, and the time known in advance that is required for the temperature increase of the fuser. On the other hand, when the fuser temperature is higher than the standby temperature, the LPR 13 sets the print wait time as zero. Then, processing goes to S415.

At S411, the LPR 13 confirms the operation mode. When the operation mode is the sleep mode, processing goes to S412. When the operation mode is not the sleep mode, processing goes to S416.

At S412, the LPR 13 acquires sleep elapsed time, which is the length of time the printer has been in the sleep mode, from the operation information.

At S413, the LPR 13 determines whether or not the acquired sleep elapsed time has exceeded a predetermined time H. In the present embodiment the time, H is set as one hour. When the sleep elapsed time has not yet exceeded one hour, processing goes to S410. The print wait time is calculated in the same manner as in the standby mode. When the sleep elapsed time is reached one hour, processing goes to S414. Note that the time H may be set as zero hours.

At S414, when the sleep elapsed time exceeds one hour, the LPR 13 sets the warm up time (WUT) as the print wait time, which is the length of time from a state in which the temperature of the fuser is as cool as room temperature through a state in which the fuser temperature becomes the temperature to start printing, i.e., the time required to reach the standby mode. The WUT is the longest time required to increase the temperature of the fuser to the print temperature. The LPR 13 acquires the WUT from each printer connected to the network at the time of activation.

At S415, the LPR 13 forms operation information list (for example, operation information list shown in FIG. 10) based on the calculated print wait time as discussed above, power consumption stored in the memory unit, and the acquired operation information. Then, processing goes to S419.

At S416 and S415, On the other hand, when the operation mode is an online mode, but is not a print mode, a standby mode, nor a sleep mode, the LPR 13 forms the information list showing an indetermination state display (for example, "x" of printer D in FIG. 13) to represent the situation in which the printer does not have functions to acquire operation information. Then, processing goes to S419.

At S417, when it is confirmed that the operation mode is not the online mode, the LPR 13 monitors the situation in which the printer is not in the online mode for a time that is equal to a predetermined re-try time.

At S418, when the re-try time has elapsed, the LPR 13 forms the information list showing an abnormal state in which the printer cannot receive a print job or is in a non-connection state, in which network connection is not possible (for example, "non-connection" of printer D in FIG. 13).

At S419, the LPR 13 updates a printer to be selected.

At S420, the LPR 13 confirms whether or not an operation information list for all printers connected to the network is formed. When the operation information list is not formed, processing goes to S402 so that the LPR 13 forms the operation information list for other printers. When the operation information list for all printers is formed, the operation information list forming processing is finished.

Figure 14:
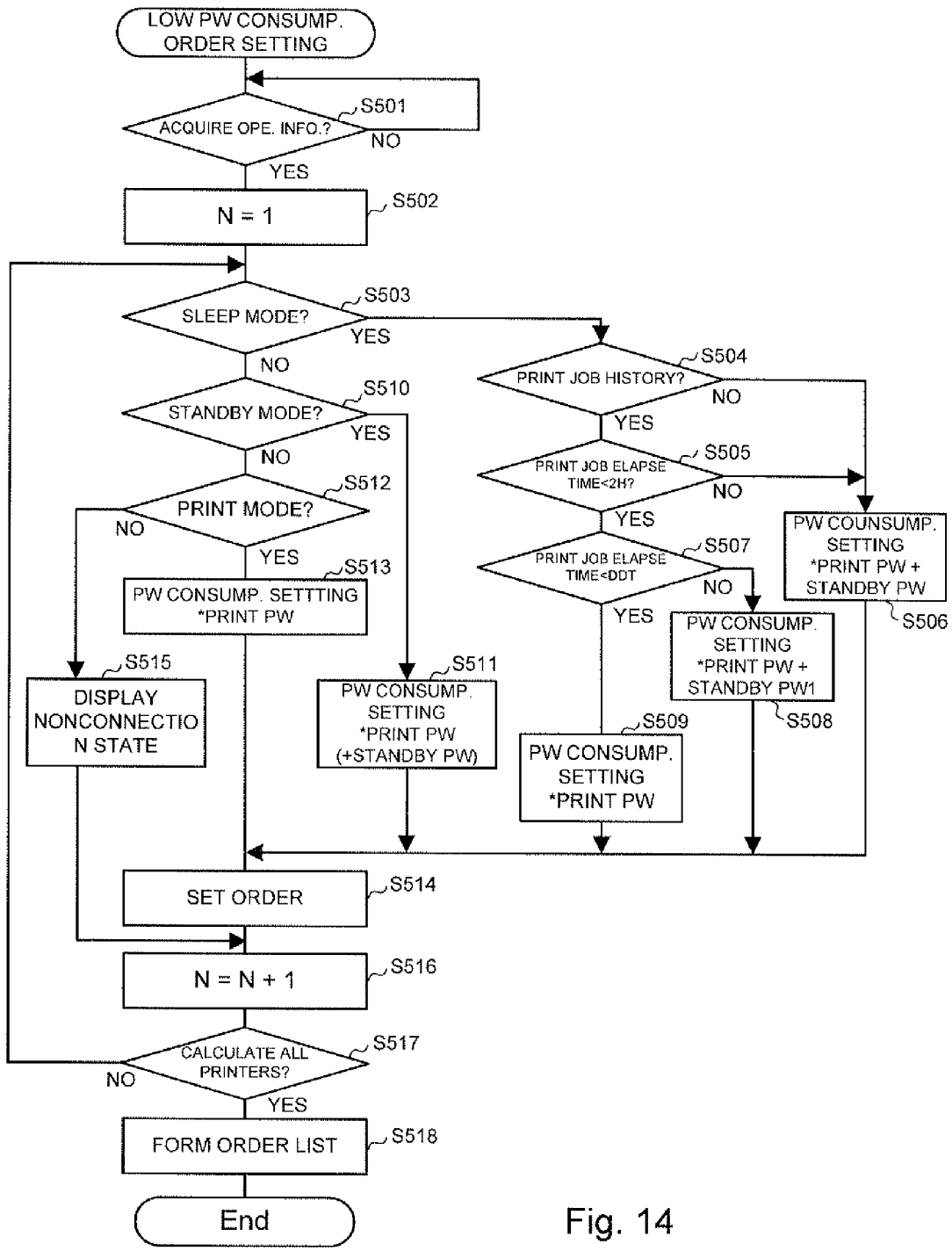
FIG. 14 is a flow diagram showing low power consumption order setting processing according to the first embodiment.

Next, low power consumption order setting processing of a printer that is performed by the LPR 13 based on the formed operation information list is explained according to Step S in a flow diagram showing the low power consumption order setting processing of the first embodiment in FIG. 14 with reference to FIG. 2.

At S501, the LPR 13 confirms acquisition of operation information from a printer connected to the network.

At S502, after the LPR 13 confirms acquisition of the operation information, the LPR 13 initializes a variable N that is for selecting each printer connected to the network as one. In the present embodiment, different values of N represent the printers as follows: one represents the printer A, two represents the printer B, and three represents the printer C.

At S503, the LPR 13 determines whether or not a printer N is in a sleep mode based on an operation mode in the operation information stored in the memory unit. When the LPR 13 determines that the printer N is in the sleep mode, processing goes to S504. When the LPR 13 determines that the printer N is not in the sleep mode, processing goes to S510.

At S504, the LPR 13 determines whether the print job history exists or not based on the print job history in the operation information stored in the memory unit. When the LPR 13 determines that the print job history exists, processing goes to S505. When the LPR 13 determines that the print job history does not exist, processing goes to S506.

At S505, the LPR 13 determines whether or not elapsed time after the print job is finished has reached or exceeded certain period of time (two hours in the present embodiment) based on standby elapsed time in the operation information stored in the memory unit. When the LPR 13 determines that the elapsed time has reached or exceeded the certain period of time, processing goes to S505. When the LPR 13 determines that the elapsed time has not yet reached or exceeded the certain period of time, processing goes to S507.

At S506, the LPR 13 calculates the power consumption (W) of the printer N by adding the power consumption (print power) (W) of the print mode to the power consumption (standby power) (W) of the standby mode based on the power consumption of the operation mode stored in the memory unit. Then, processing goes to S514.

At S507, the LPR 13 determines whether or not the elapsed time after the print job is finished has reached or exceeded a certain period of time for default delay to the sleep mode (DDT) based on an operation mode in the operation information stored in the memory unit. When the LPR 13 determines that the certain period has been reached or exceeded, processing goes to S508. When the LPR 13 determines that the time period has not been reached or exceeded, processing goes to S509.

At S508, the LPR 13 calculates power consumption (W) of the printer N by adding power consumption (print power) (W) of the print mode in an operation mode to power consumption (standby power 1) (W) of the standby mode in an operation mode based on power consumption of an operation mode stored in the memory unit. Then, processing goes to S514.

The fuser maintains a certain temperature according to the history of performing print jobs. The power consumption for a period of time [(elapsed time after the print job is finished)−(default delay to the sleep mode DDT)] is required according to a correlation of the fuser temperature. The standby power 1 is equal to the following formula, standby power (W)×60 (minutes)/[(elapsed time after the print job is finished)−(default delay to the sleep mode DDT)].

At S509, the LPR 13 treats power consumption (print power) (W) in the print mode as the power consumption (W) of the printer N based on power consumption of the operation mode stored in the memory unit. Then, processing goes to S514. In this case, the standby power is not required because the fuser temperature is already equal to the print temperature.

At S510, when the LPR 13 determines that it is not in the sleep mode in S503, the LPR 13 determines whether or not the printer N is in the standby mode based on an operation mode of the operation information stored in the memory unit. When the LPR 13 determines that it is in the standby mode, processing goes to S511. When the LPR 13 determines that it is not in the standby mode, processing goes to S512.

At S511, the LPR 13 treats power consumption (print power) (W) of the print mode in an operation mode as power consumption (W) of the printer N based on power consumption of the operation mode stored in the memory unit. Then, processing goes to S514.

When the fuser temperature is not maintained at the print temperature, the LPR 13 calculates the power consumption (W) of the printer N by adding the power consumption (print power) (W) of the print mode to the power consumption (standby power 1 as discussed above) (W) of the standby mode.

At S512, the LPR 13 determines whether or not the printer N is in the print mode based on the operation mode of the operation information stored in the memory unit. When the LPR 13 determines that it is in the print mode, processing goes to S513. When the LPR 13 determines that it is not in the print mode, processing goes to S515.

At S513, the LPR 13 treats power consumption (print power) (W) of the print mode as power consumption (W) of the printer N based on the power consumption of the operation mode stored in the memory unit. Then, processing goes to S514.

At S514, the LPR 13 sets the order of the calculated values of power consumption (W) in ascending order. Then, processing goes to S516. When two values of power consumption (W) are the same, the two values are given the same order.

At S515, when the operation mode of the printer N is none of the sleep mode, the standby mode, and the print mode, the LPR 13 forms an operation information list in which the printer N is in a non-connection state.

At S516, a printer that will be selected is updated by adding one to the variable N.

At S517, the LPR 13 determines whether or not power consumption for all printers connected to the network is set. When a printer in which power consumption is not set exists, processing goes to S503 and is repeated. When setting of power consumption for all printers is finished, processing goes to S518.

At S518, the LPR 13 sets the order of power consumption for all printers connected to the network. The LPR 13 forms an operation information list based on the order.

As discussed above, the LPR 13 decides the order of power consumption for each printer based on the operation mode and power consumption information received from each of the printers connected to the network. The LPR 13 forms the operation information list based on the order.

Next, the print wait time order setting of the operation information list is explained.

Figure 15A:
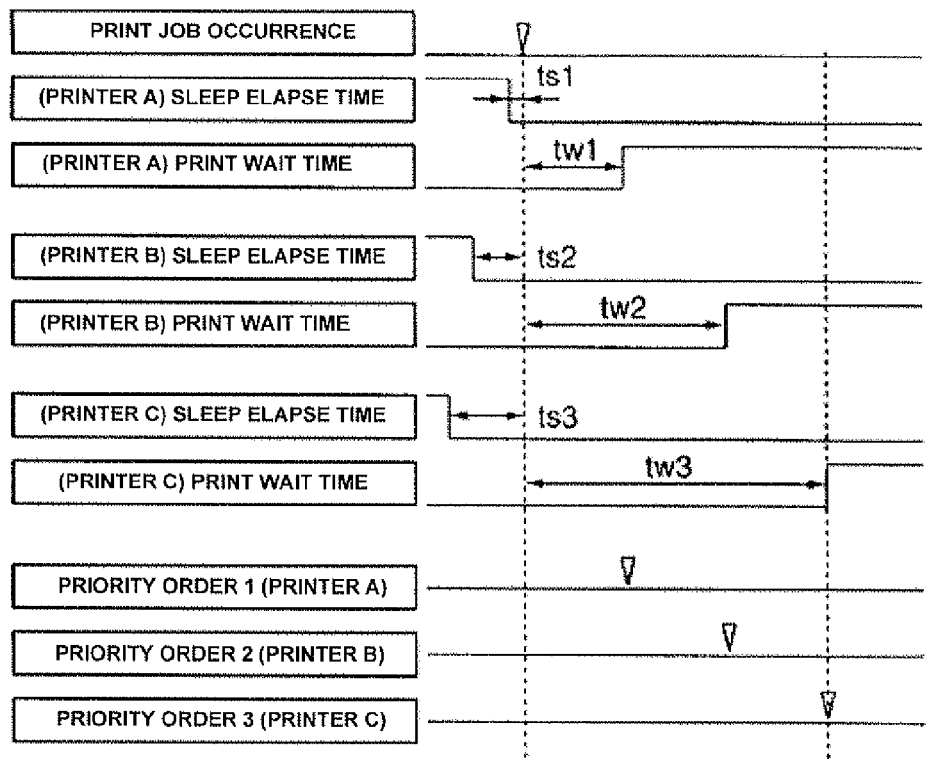
FIGS. 15A and 15B are explanatory diagrams of print wait time order setting according to the first embodiment.
Figure 15B:
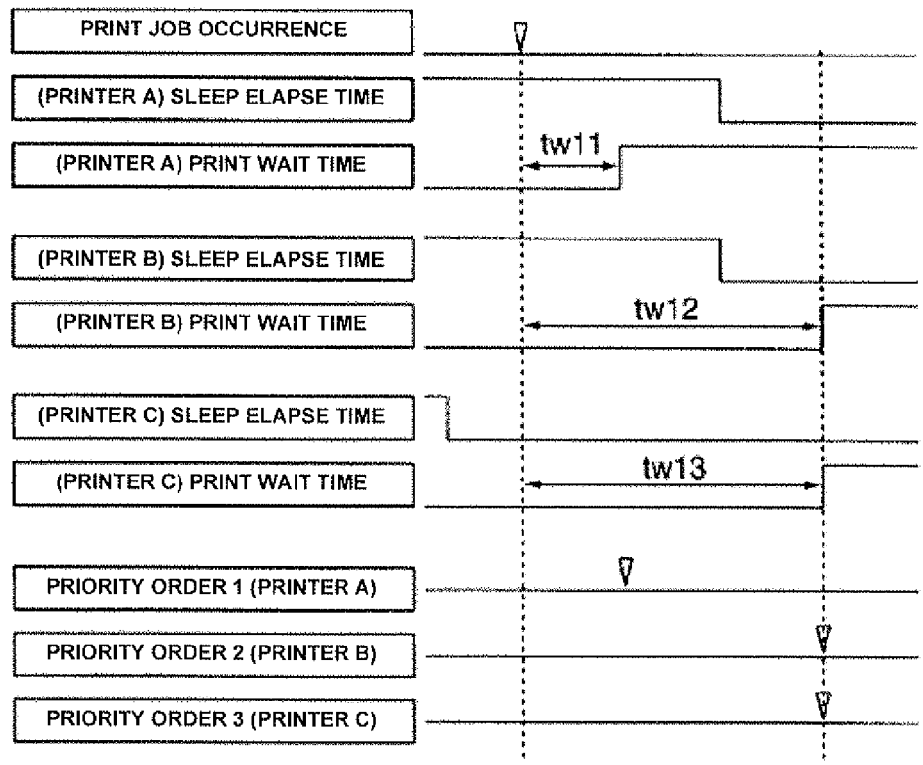

FIGS. 15A and 15B are explanatory diagrams of the print wait time order setting according to a first embodiment. The print wait time and sleep elapsed time of the printers A through C are shown on the time axis (horizontal axis).

The print wait time is the duration of time required from an occurrence of a print job for each printer through starting of print operation. The sleep elapsed time is elapsed time after an operation mode is shifted to the sleep mode.

When the predetermined time DDT has elapsed from the online mode as a print ready state or a print completion state, i.e., the standby mode, each printer is shifted to the sleep mode discussed above.

FIG. 15A shows examples of a printer A, printer B, and printer C that are already shifted to a sleep mode at the time of occurrence of a print job. In FIG. 15A, "ts1" represents sleep elapsed time of the printer A at the time of the print job occurrence; "ts2" represents sleep elapsed time of the printer B at the time of the print job occurrence; "ts3" represents sleep elapsed time of the printer C at the time of the print job occurrence; "tw1" represents print wait time of the printer A; "tw2" represents print wait time of the printer B; and "tw3" represents print wait time of the printer C.

In the case discussed above, the sleep elapsed time has the following relationship: ts1<ts2<ts3. Similarly, the print wait time has the following relationship: tw1<tw2<tw3. When the sleep elapsed time is longer, the fuser temperature is lower, and the required time for increasing the fuser temperature and for starting printing is longer. Therefore, the print wait time is longer when the sleep elapsed time is longer. When the priority order is given in order of shorter print wait time, the printer A has the priority order 1, the printer B has the priority order 2, and the printer C has the priority order 3.

FIG. 15B shows examples of the printer A and the printer B that are not shifted to the sleep mode at the time of occurrence of the print job, and the printer C that is already shifted to the sleep mode at the time of occurrence of the print job. In FIG. 15B, "tw11" represents print wait time of the printer A; "tw12" represents print wait time of the printer B; and "tw13" represents print wait time of the printer C.

In the present embodiment, since the print wait time of the printer A and the printer B in the standby mode is zero, the print wait time has the following relationship: tw11=tw12 (=0)<tw13. However, when the fuser temperature in the standby mode is lowered, the print wait time may have the following relationship: tw11<tw12=tw13. In this case, when the priority order is given in order of shorter print wait time, the printer A has the priority order 1, and the printer B and the printer C both have the priority order 2. But, when the priority is given to a printer in the standby mode for assigning the priority order, the printer A has the priority order 1, the printer B has the priority order 2, and the printer C has the priority order 3. Because a printer in the sleep mode need much power consumption, a printer in the standby mode has the priority.

Figure 16:
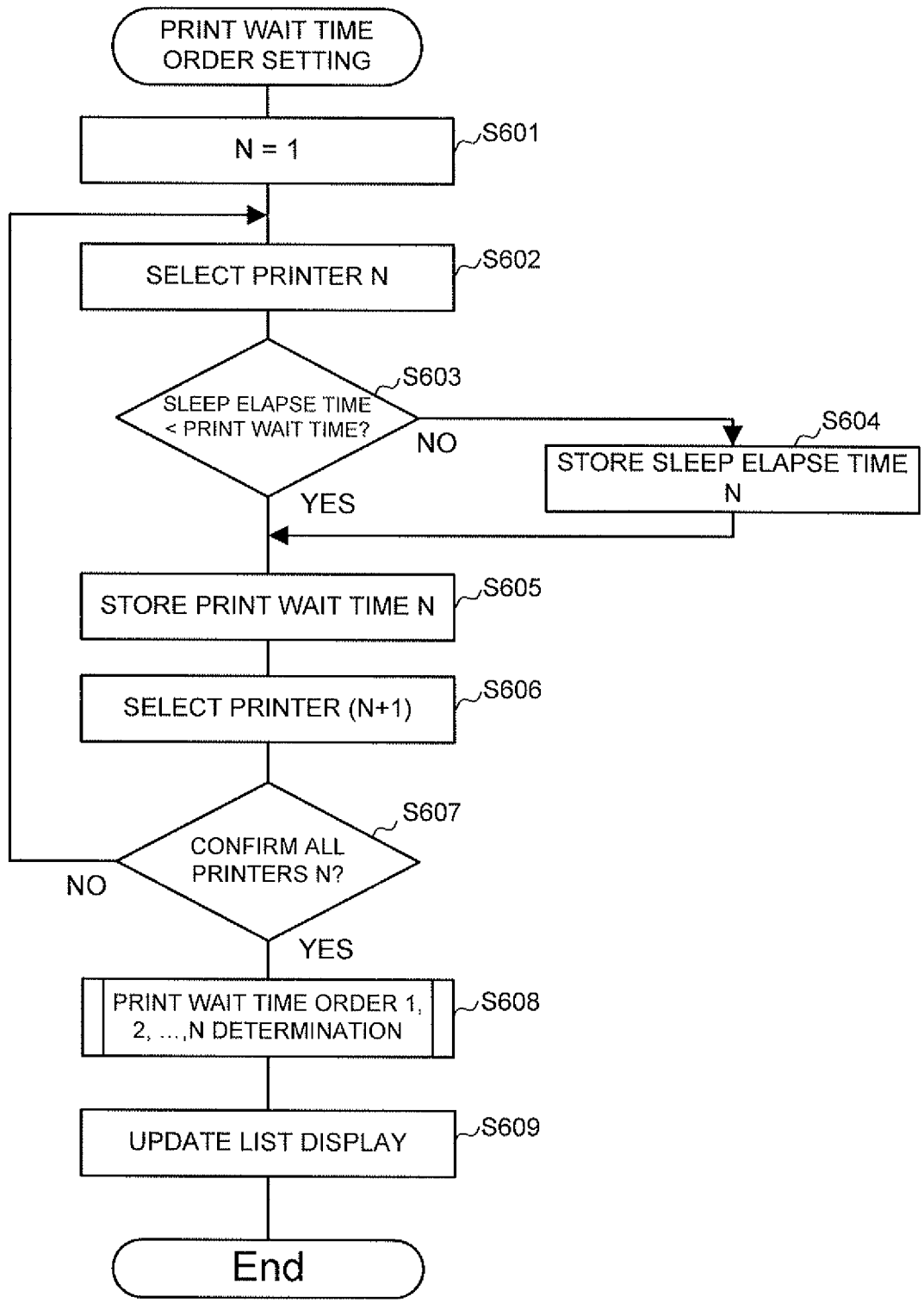
FIG. 16 is a flow diagram showing print wait time order setting processing according to the first embodiment.
Figure 17:
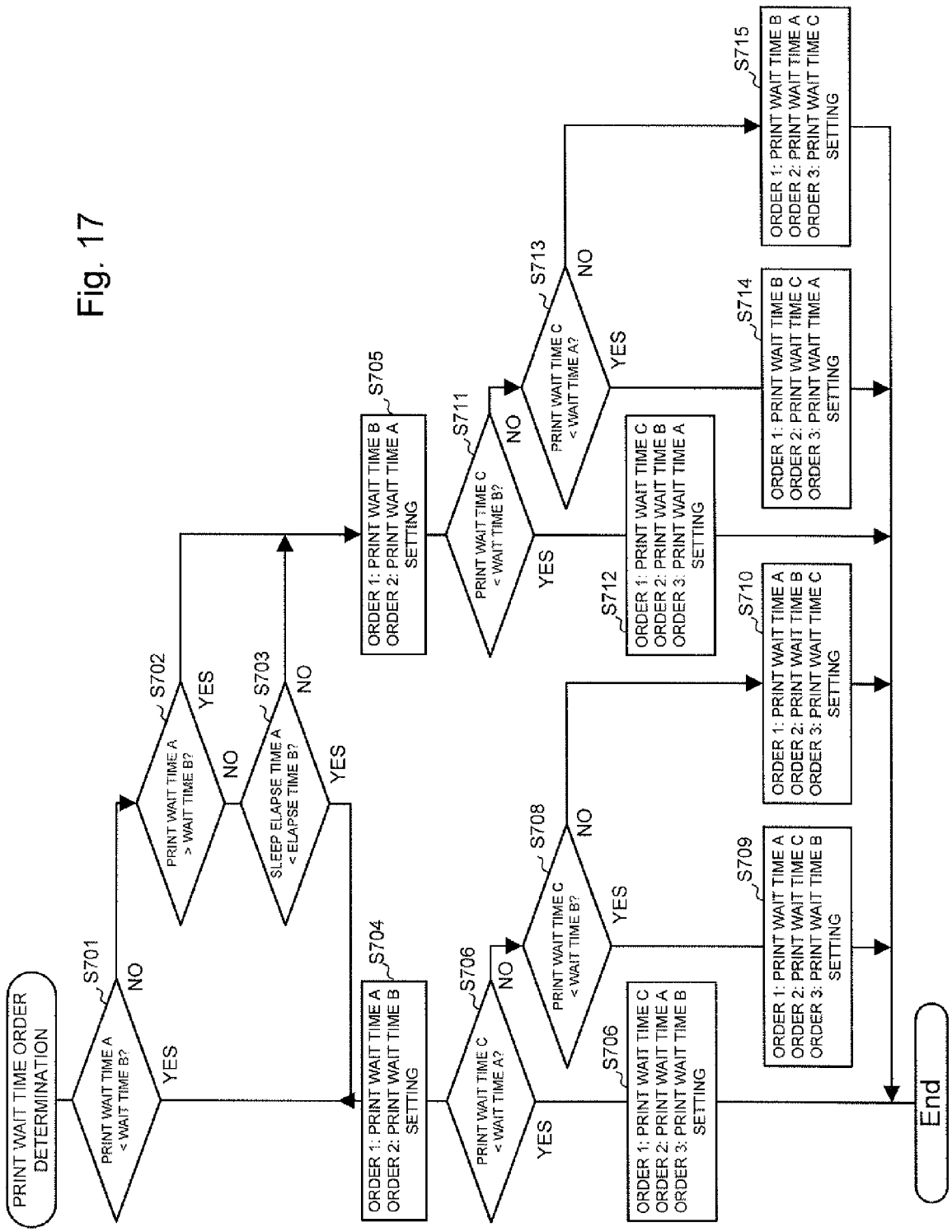
FIG. 17 is a flow diagram showing print wait time order determination processing according to the first embodiment.

Next, print wait time order setting processing performed by an LPR based on a formed operation information list is explained according to Step S in a flow diagram showing the print wait time order setting processing of the first embodiment in FIG. 16 and print wait time order determination processing performed by the LPR based on the formed operation information list is explained according to Step S in a flow diagram showing the print wait time order determination processing of the first embodiment in FIG. 17 with reference to FIG. 2.

First, the print wait time order setting processing in FIG. 16 is explained.

At S601, the LPR 13 initializes a variable N that is for selecting each printer connected to the network as one. In the present embodiment, different values of the variable N represent the various printers as follows: N=1 represents the printer A, N=2 represents the printer B, and N=3 represents the printer C.

At S602, the LPR 13 selects the printer N.

At S603, the LPR 13 compares a sleep elapsed time in operation information of the printer N with calculated print wait time. When the LPR 13 determines that the sleep elapsed time is shorter than the print wait time, processing goes to S605. The LPR 13 determines that the sleep elapsed time is not shorter than the print wait time, processing goes to S604. When the printer N is not in the sleep mode, the sleep elapsed time is zero.

At S604, when the sleep elapsed time is not shorter than the print wait time, i.e., when the sleep elapsed time is equal to or longer than the print wait time, the sleep elapsed time of the printer N is stored in the memory unit by the LPR 13. Then, processing goes to S605.

At S605, the print wait time of the printer N is stored in the memory unit by the LPR 13.

At S606, one is added to the variable N so that the variable N is updated.

At S607, the LPR 13 determines whether or not the sleep elapsed time and the print wait time for all printers connected to the network are confirmed. When a printer in which the sleep elapsed time and the print wait are not confirmed to exist, processing goes to S602 and is repeated. When confirmation of the sleep elapsed time and the print wait time for all printers is finished, processing goes to S608.

At S608, the LPR 13 performs the print wait time order setting processing discussed later.

At S609, the LPR 13 updates the information list with the print wait time order that is set by the print wait time order setting processing, displays the updated information list, and finishes processing.

Next, the print wait time order determination processing performed by the LPR 13 in S608 discussed above is explained in detail with reference to FIG. 17. In order to simplify the explanation, printers connected to the network are the printer A, the printer B, and the printer C in FIG. 17.

At S701, the LPR 13 compares the print wait time of the printer A (print wait time A) with the print wait time of the printer B (print wait time B). When the comparison result is as follows: (print wait time A)<(print wait time B), processing goes to S704. When the comparison result is not as follows: (print wait time A)<(print wait time B), processing goes to S702.

At S702, when the comparison result is as follows: (print wait time A)>(print wait time B), processing goes to S705. When the comparison result is not as follows: (print wait time A)<(print wait time B), i.e., when the comparison result is as follows: (print wait time A)=(print wait time B), processing goes to S703.

At S703, the LPR 13 further compares the sleep elapsed time of the printer A (sleep elapsed time A) with the sleep elapsed time of the printer B (sleep elapsed time B).

When the comparison result is as follows: (sleep elapsed time A)<(sleep elapsed time B), processing goes to S704. When the comparison result is as follows: (sleep elapsed time A)>(sleep elapsed time B), processing goes to S705.

At S704, the LPR 13 sets the print wait time A as order 1 and sets the print wait time B as order 2. Then, processing goes to S706.

At S705, the LPR 13 sets the print wait time B as order 1 and sets the print wait time A as order 2. Then, processing goes to S711.

When the sleep elapsed time A is equal to the sleep elapsed time B at S703, the LPR 13 sets both the print wait time A and the print wait time B as order 1.

At S706, when the comparison result is as follows: (print wait time A)<(print wait time B), the LPR 13 compares the print wait time A with the print wait time of the printer C (print wait time C). When the comparison result is as follows: (print wait time C)<(print wait time A), processing goes to S707. When the comparison result is not as follows: (print wait time C)<(print wait time A), processing goes to S708.

At S707, the LPR 13 sets the print wait time C as order 1, sets the print wait time A as order 2, and sets the print wait time B as order 3. Then, processing is finished.

At S708, the LPR 13 compares the print wait time B with the print wait time C. When the comparison result is as follows: (print wait time C)<(print wait time B), processing goes to S709. When the comparison result is not as follows: (print wait time C)<(print wait time B), processing goes to S710.

At S709, the LPR 13 sets the print wait time A as order 1, sets the print wait time C as order 2, and sets the print wait time B as order 3. Then, processing is finished.

At S710, the LPR 13 sets the print wait time A as order 1, sets the print wait time B as order 2, and sets the print wait time C as order 3. Then, processing is finished.

When the print wait time A is equal to the print wait time C, the LPR 13 compares the sleep elapsed time A with the sleep elapsed time of the printer C (sleep elapsed time C), and the priority order is given to the print wait time of a printer in which the sleep elapsed time is shorter. When the print wait time B is equal to the print wait time C, the LPR 13 compares the sleep elapsed time B with the sleep elapsed time C, and the priority order is given to the print wait time of a printer in which the sleep elapsed time is shorter. When the sleep elapsed time is also the same, both the print wait time have the same order.

At S711-S715, when the comparison result is as follows: (print wait time A)>(print wait time B), the LPR 13 performs the same processing of S706-S710. Then, the LPR 13 sets the order for the print wait time A, the print wait time B, and the print wait time C.

In other words, the LPR 13 sets the order of the print wait time in the following manner. First the LPR 13 sets the order in order of shorter print wait time for each printer. Next, when the print wait time is the same, the LPR 13 sets the order in order of shorter sleep elapsed time. Further, when the sleep elapsed time is also the same, the LPR 13 sets the same order.

As just described, the LPR 13 sets the order of the print wait time for each printer based on the print wait time and the sleep elapsed time obtained from operation information received from each of the printers connected to the network.

As discussed above, the LPR of a host computer displays low power consumption order and print wait time order for each printer at the display unit. A user of the present image forming system selects a printer for print based on the displayed low power consumption order and print wait time order for each printer. When the host computer accepts this selection, the host computer sends a print job to the selected printer.

As explained above, in the first embodiment, low power consumption order and print wait time order for each printer is displayed at the display unit of the host computer as an information list. There is an effect that a user of an image forming system can select a printer for print operation by prioritizing either power consumption or wait time for starting print operation.

(Second Embodiment) A configuration of a second embodiment has an operation information priority order automatic selection unit, a print job sheet number memory unit, and an update data preparation memory unit in addition to an LPR of a host computer of the first embodiment.

Figure 18:
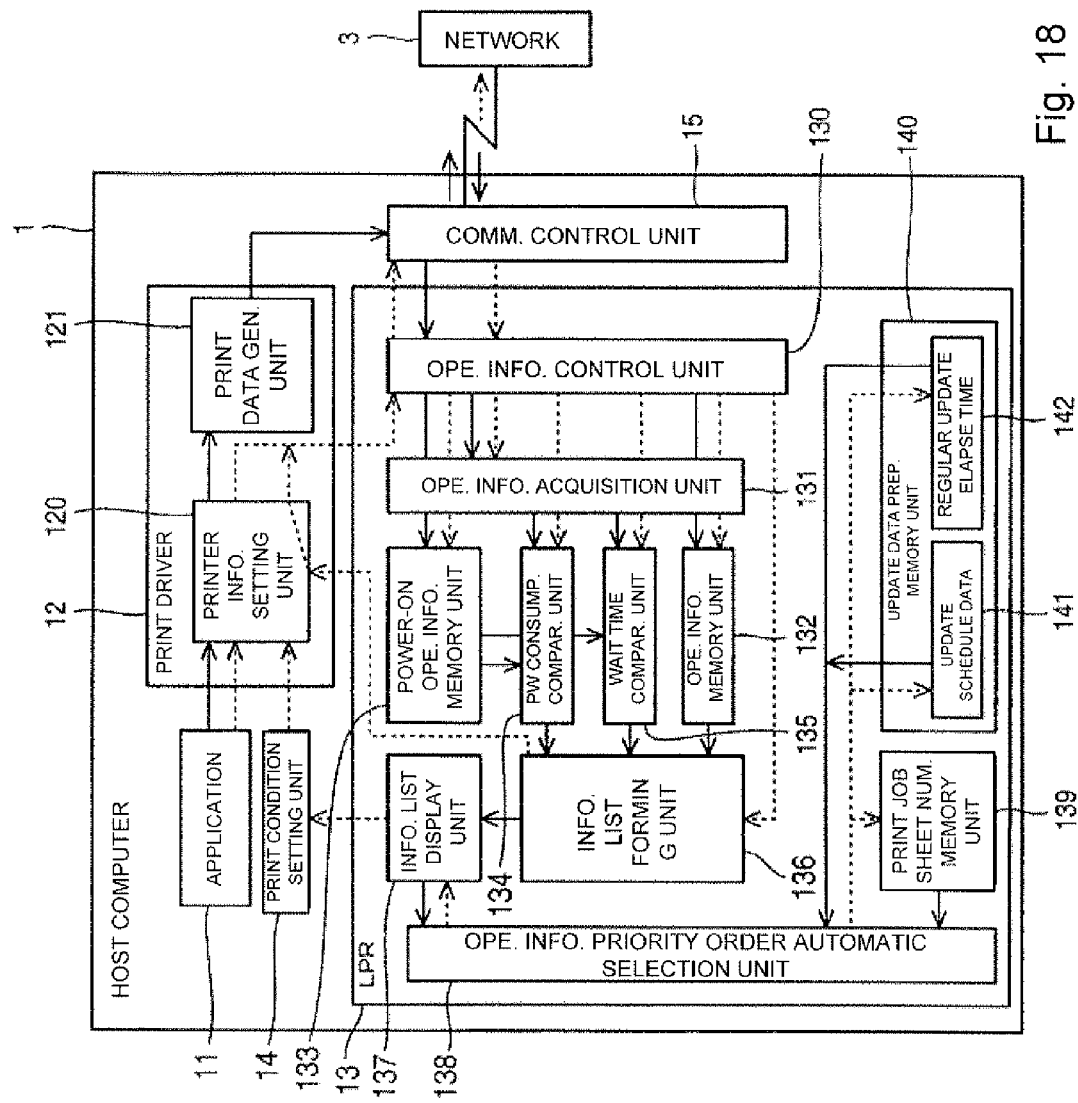
FIG. 18 is a block diagram of a configuration of a host computer according to a second embodiment.

The configuration of the second embodiment is explained based on a block diagram showing a configuration of a host computer according to the second embodiment in FIG. 18. The parts that are the same as the first embodiment have the same reference numerals, and its explanation is omitted.

In FIG. 18, the LPR 13 is configured with an operation information control unit 130, an operation information acquisition unit 131, an operation information memory unit 132, a power-on operation information memory unit 133, a power consumption comparison unit 134, a wait time comparison unit 135, an information list forming unit 136, an information list display unit 137, an operation information priority order automatic selection unit 138, a print job sheet number memory unit 139, and an update data preparation memory unit 140.

In the update data preparation memory unit 140, update schedule data 141 as prediction data at the time of regular update timing of an operation information list is temporarily stored; and regular update elapsed time 142 as elapsed time from the previous regular update timing to the timing for storing the update schedule data 141. These are stored by the operation information acquisition unit 131.

The print job sheet number memory unit 139 stores the number of the print sheets (or the amount of the print sheets) of the received print job.

The operation information priority order automatic selection unit 138 as a selection module selects a printer to which the print job is output based on one of order between the low power consumption order and the print wait time order in the operation information list.

Figure 19:
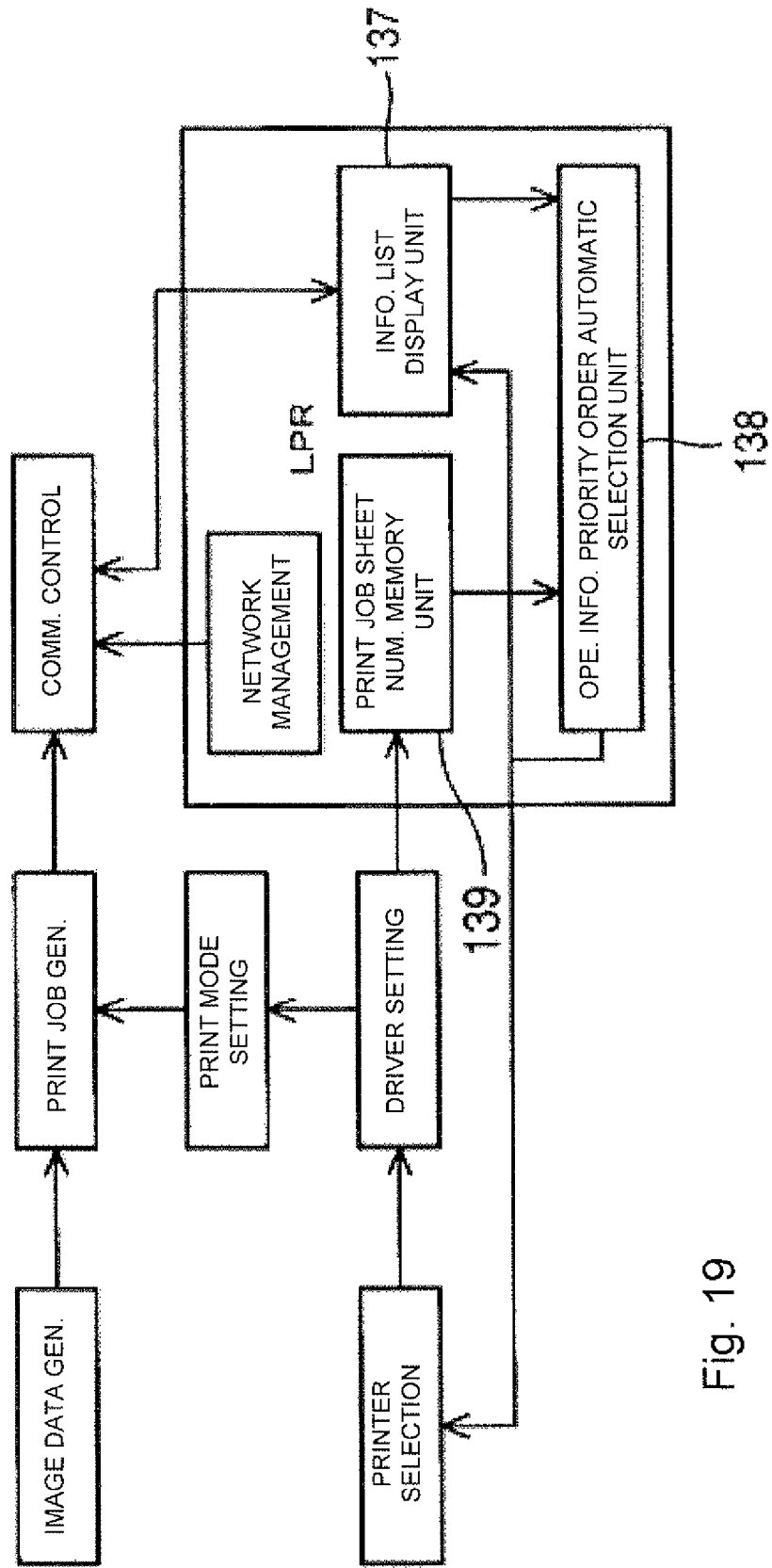
FIG. 19 is a block diagram of operation of a host computer according to a second embodiment.

Operation for selecting a printer for printing through operation information acquired from a printer by the host computer is explained based on a block diagram showing operation of the host computer according to the second embodiment in FIG. 19.

In FIG. 19, the following is the same as the first embodiment. The information list display unit 137 of the LPR 13 of the host computer 1 and an information list forming unit (not shown) generates the low power consumption order and the print wait time order based on operation information acquired from a printer.

The operation information priority order automatic selection unit 138 acquires the number of print sheets of a print job as print job sheet number from a printer driver 12 and stores it in the print job sheet number memory unit 139. The operation information priority order automatic selection unit 138 compares the print job sheet number with the number of specified sheets (specified sheet number) that is stored in the memory unit in advance as a threshold value. When the print job sheet number is equal to or more than the specified sheet number, a printer for executing the print job is selected according to the low power consumption order. On the other hand, when the print job sheet number is less than the specified sheet number, a printer for executing the print job is selected according to the print wait time order.

The specified sheet number may be stored as a fixed value. The specified sheet number may be a setting item of the LPR 13 and may be set in the memory unit 139 as a freely changeable value.

Working of the structures discussed above is explained.

Figure 20A:
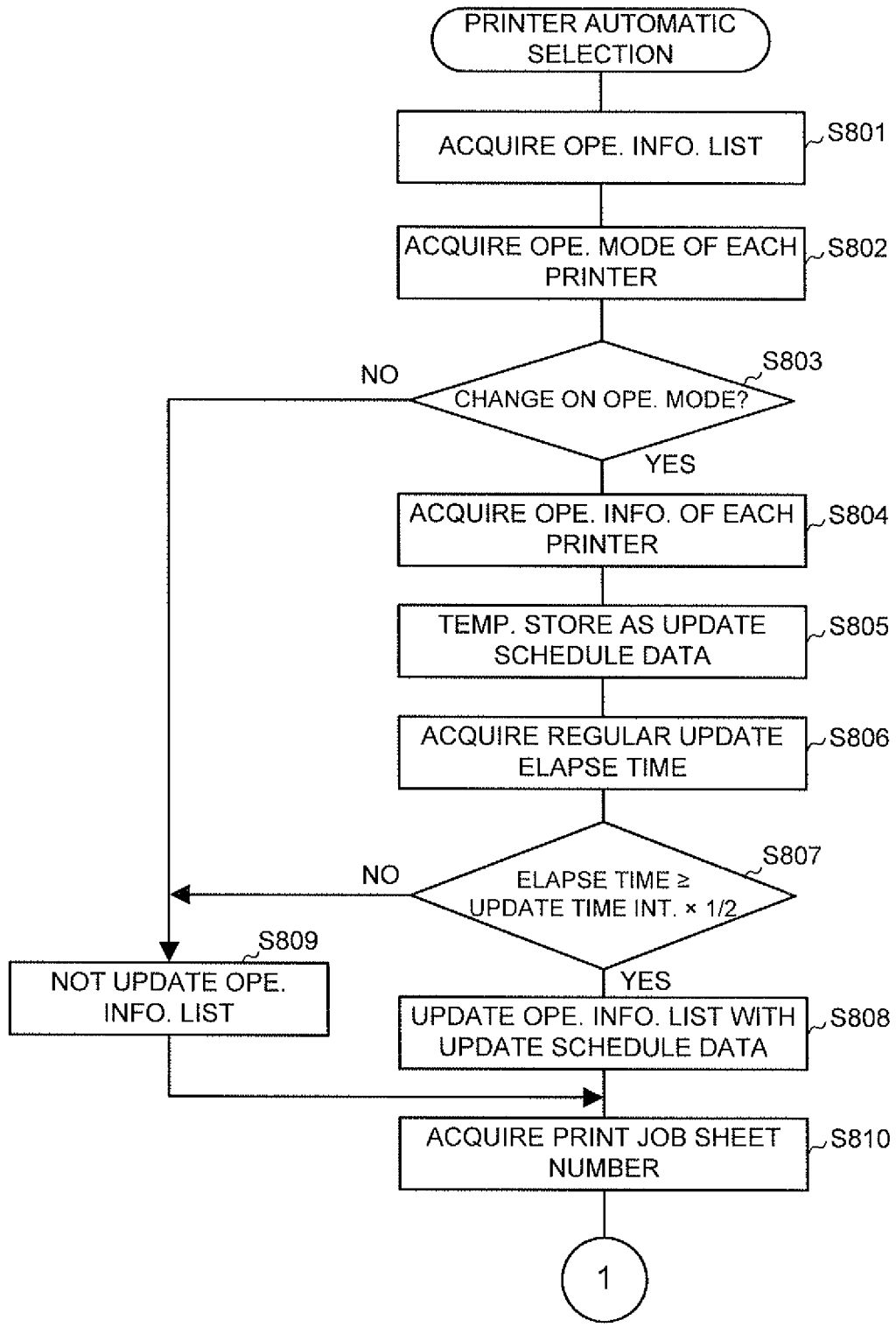
FIGS. 20A and 20B are a flow diagram showing printer selection processing according to a second embodiment.
Figure 20B:
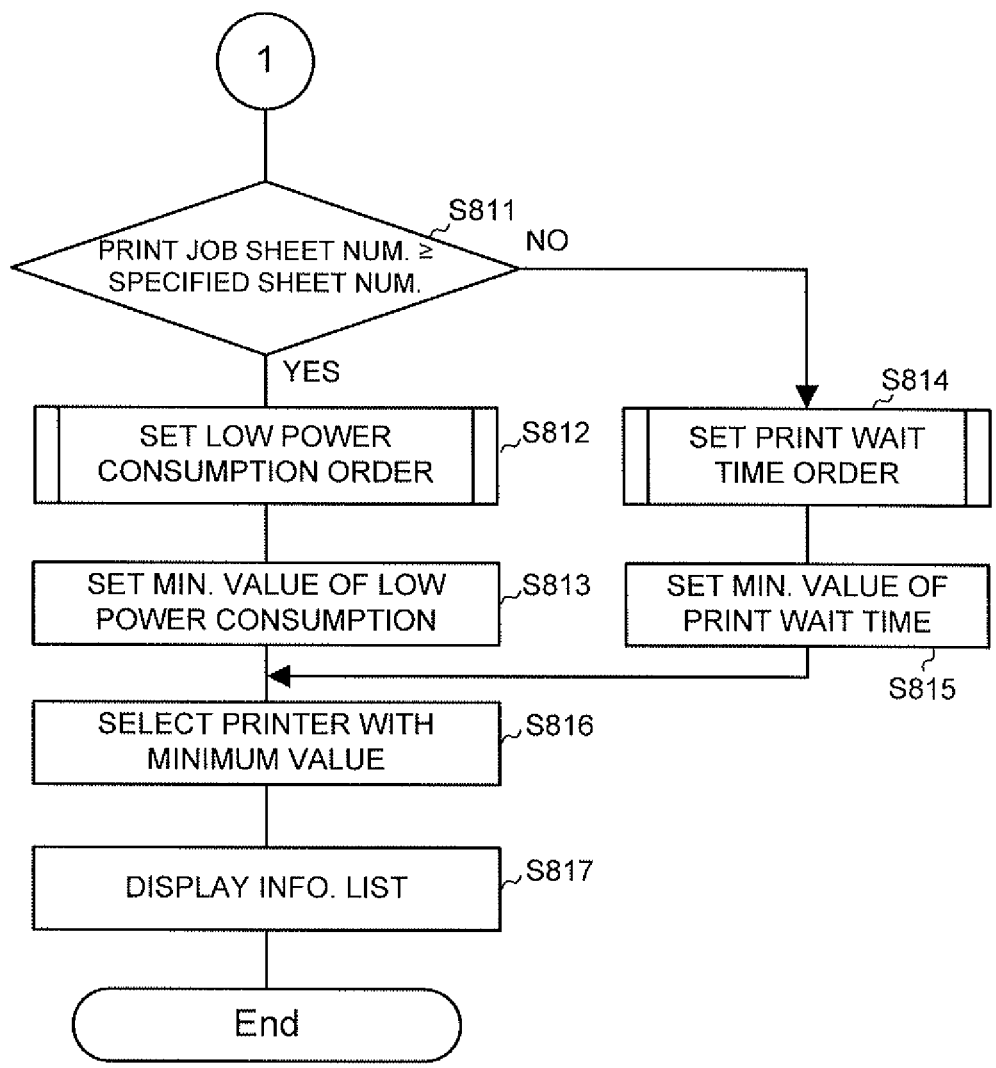

Printer selection processing performed by an LPR 13 of a host computer 1 is explained according to Step S in a flow diagram showing the printer selection processing of the second embodiment in FIGS. 20A and 20B with reference to FIG. 18. When a print job is generated in the host computer 1, the present processing is activated.

At S801, the LPR 13 acquires an operation information list that is formed through the operation information list forming processing shown in FIG. 9 from the memory unit. The operation information list is formed based on operation information that is regularly acquired from the printer 2.

At S802, the LPR 13 acquires an operation mode of each printer 2 connected to the network.

At S803, the LPR 13 compares the acquired operation mode of each printer 2 with an operation mode in the operation information list acquired in S801 and determines whether or not the operation mode is changed. When the operation mode is changed, processing goes to S804. When the operation mode is not changed, processing goes to S809.

At S804, when the operation mode is changed, the LPR 13 requests operation information to a printer 2 in which the operation mode is changed and acquires the operation information from the printer 2.

At S805, the acquired operation information is temporarily stored in the update data preparation memory unit 140 as the update schedule data 141 by the LPR 13.

At S806, the LPR 13 acquires elapsed time from the regular update timing in which the operation information list is acquired from the regular update elapsed time 142.

At S807, the LPR 13 determines whether or not the acquired elapsed time from the regular update timing is reached to "regular update timing interval×½." When the LPR 13 determines that it is reached, processing goes to S808. When the LPR 13 determines that it is not reached, processing goes to S809.

At S808, the LPR 13 treats the update schedule data 141 stored in the update data preparation memory unit 140 as operation information and forms an operation information list based on the operation information. The use of the operation information list is stored in the memory unit. Then, processing goes to S810.

At S809: On the other hand, when it is determined that the operation mode is not changed in S803, and when it is determined that the acquired elapsed time from the regular update timing is not reached "(regular update timing interval×½)" in S807, the LPR 13 uses the operation information list acquired from the memory unit in S801 without acquiring new operation information from a printer 2.

At S810, the LPR 13 acquires the number of print sheets (print sheet number) of a print job as print job sheet number from a printer driver 12.

At S811, the LPR 13 compares the print job sheet number with the number of specified sheets (specified sheet number) that is stored in the memory unit in advance as a threshold value. When it is determined that the print job sheet number is equal to or more than the specified sheet number, processing goes to S812. When it is determined that the print job sheet number is less than the specified sheet number, processing goes to S814.

At S812, when the LPR 13 determines that the print job sheet number is equal to or more than the specified sheet number, the LPR 13 performs the low power consumption order setting processing shown in FIG. 14 based on the acquired operation information list.

At S813, the LPR 13 extracts a printer with minimum power consumption, i.e., a printer with the highest rank of the low power consumption order. Then, processing goes to S816.

At S814: On the other hand, when the LPR 13 determines that the print job sheet number is less than the specified sheet number, the LPR 13 performs the print wait time order setting processing shown in FIG. 16 based on the acquired operation information list.

At S815, the LPR 13 extracts a printer with minimum print wait time, i.e., a printer with the highest rank of the print wait time order. Then, processing goes to S816.

At S816, the LPR 13 selects the extracted printer and output a print job to the printer.

At S817, the LPR 13 updates the information list, displays it, and finishes processing.

As just described, when the print job sheet number is equal to or more than the specified sheet number, the LPR of the host computer selects a printer for executing the print job according to the low power consumption order. On the other hand, when the print job sheet number is less than the specified sheet number, the LPR selects a printer for executing the print job according to the print wait time order.

As explained above, in the second embodiment, since a printer for executing a print job is selected according to the low power consumption order or the print wait time order in response to the print job sheet number, the following effects can be obtained: power consumption is minimized; and when it is the case of a print job in which the power consumption of a printer is small, a printer for which the print wait time is short can be preferentially selected.

In the first and second embodiments, a printer that is connected to a network is explained as an example of an image forming device. However, these embodiments are not limited to this. An example of the image forming device may be a multifunction machine that is connected to a network. Specifically, in the case of the multifunction machine, effective operation can be performed when existence or nonexistence of an operator's operation is added as operation information.

The image forming system being thus described, it will be apparent that the same may be varied in many ways. Such variations are not to be regarded as a departure from the sprit and scope of the invention, and all such modifications as would be apparent to one of ordinary skill in the art are intended to be included within the scope of the following claims.

What is claimed is:

1. An image forming system, comprising:
a plurality of image forming devices, which form images by receiving an image forming instruction; and
an information processing device in communication with the plurality of image forming devices, and that sends the image forming instruction to the image forming devices, wherein
each of the image forming devices includes a memory module that stores an operation mode showing a state of the image forming device and that stores power consumption information of the operation mode in advance;
the operation mode being one of a plurality of operation modes that includes a standby mode in which the image forming device is ready to receive the image forming instruction, a power saving mode in which power consumption is reduced, and an image forming mode for forming an image by the received image forming instruction;
the information processing device includes:
an acquisition module that acquires the operation mode and the power consumption information stored in the memory module of each of the image forming devices;
an order determination module that assigns a power consumption order to each of the image forming devices according to power consumption based on the operation mode, that calculates, based on the operation mode, image forming wait time from the time of receiving the image forming instruction at each of the image forming devices to the time of starting an image forming operation, and that assigns an image forming wait time order to each of the image forming devices according to image forming wait time; and
a display device that displays the power consumption order and the image forming wait time order of each of the image forming devices assigned by the order determination module;
the acquisition module acquires elapsed time from when the image forming device is shifted from the standby mode to the power saving mode in addition to the acquisition of the operation mode and the power consumption information; and
the order determination module sets the image forming wait time order of the image forming device in which the elapsed time is shorter to higher order when two of the calculated image forming wait times are the same.

2. The image forming system according to one of claim 1, wherein
the order determination module calculates the image forming wait time as zero when the operation mode is the standby mode;
the order determination module calculates the image forming wait time as a time required to shift to the standby mode when the operation mode is the power saving mode; and
the order determination module calculates the image forming wait time as time required for finishing image forming processing when the operation mode is the image forming mode.

3. An image forming system, comprising:
a plurality of image forming devices, which form images by receiving an image forming instruction; and
an information processing device in communication with the plurality of image forming devices, and that sends the image forming instruction to the image forming devices, wherein
each of the image forming devices includes a memory module that stores an operation mode showing a state of the image forming device and that stores power consumption information of the operation mode in advance;

the operation mode being one of a plurality of operation modes that includes a standby mode in which the image forming device is ready to receive the image forming instruction, a power saving mode in which power consumption is reduced, and an image forming mode for forming an image by the received image forming instruction;

the information processing device includes:

an acquisition module that acquires the operation mode and the power consumption information stored in the memory module of each of the image forming devices;

an order determination module that assigns a power consumption order to each of the image forming devices according to power consumption based on the operation mode, that calculates, based on the operation mode, image forming wait time from the time of receiving the image forming instruction at each of the image forming devices to the time of starting an image forming operation, and that assigns an image forming wait time order to each of the image forming devices according to image forming wait time; and a selection module that selects one of the image forming devices to which the image forming instruction is to be sent based on either the power consumption order or the image forming wait time order of each of the image forming devices assigned by the order determination module;

the acquisition module acquires elapsed time from when the image forming device is shifted from the standby mode to the power saving mode in addition to the acquisition of the operation mode and the power consumption information; and the order determination module sets the image forming wait time order of the image forming device in which the elapsed time is shorter to higher order when two of the calculated image forming wait times are the same.

4. The image forming system according to claim 3, wherein the selection module selects one of the image forming devices to which the image forming instruction is to be sent based on the image forming wait time order when the number of image forming sheets contained in the received image forming instruction is determined to be less than a threshold value stored in a memory unit in advance; and the selection module selects one of the image forming devices to which the image forming instruction is to be sent based on the power consumption order when the number of image forming sheets contained in the received image forming instruction is determined to be equal to or more than the threshold value stored in the memory unit in advance.

5. The image forming system according to one of claim 3, wherein the order determination module calculates the image forming wait time as zero when the operation mode is the standby mode;

the order determination module calculates the image forming wait time as a time required to shift to the standby mode when the operation mode is the power saving mode; and the order determination module calculates the image forming wait time as time required for finishing image forming processing when the operation mode is the image forming mode.

6. A method of forming images with improved efficiency, wherein each of a plurality of image forming devices forms an image by receiving an image forming instruction from an information processing device, which sends the image forming instruction to the image forming devices through a network, the method comprising:

storing operation modes and power consumption information corresponding to the operation modes in the image forming devices in advance, the operation modes including a standby mode, in which the image forming device is ready to receive the image forming instruction, a power saving mode, in which power consumption is reduced, and an image forming mode, in which an image is being formed based on the image forming instruction;

acquiring a current operation mode and power consumption information from each of the image forming devices;

determining a power consumption order to each of the image forming devices according to power consumption based on the current operation mode;

determining, based on the operation mode, image forming wait times for each of the image forming devices, which is a delay time from the time of receiving the image forming instruction at each of the image forming devices to the time of starting an image forming operation;

assigning an image forming wait time order to each of the image forming devices according to the image forming wait time;

acquiring an elapsed time from when each image forming device is shifted from the standby mode to the power saving mode;

assigning the image forming wait time order to each image forming device in accordance with the image forming wait time and the elapsed time of each image forming device;

if the image forming wait times for two of the image forming devices are the same, assigning a higher order to a one of the two the image forming devices for which the elapsed time is shorter; and selecting one image forming device to which the image forming instruction is to be sent among the plurality of image forming devices based on one of the power consumption order and the image forming wait time order.

7. The method according to claim 6 including displaying the power consumption order and the image forming wait time order on a display device.

8. The method according to claim 6, wherein the method includes:

determining the image forming wait time to be zero when the operation mode is the standby mode;

determining the image forming wait time to be a time required to shift to the standby mode when the operation mode is the power saving mode; and determining the image forming wait time to be a time required for finishing image forming processing when the operation mode is the image forming mode.

9. The method according to claim 6, wherein the selecting of an image forming device is based on the image forming wait time order when the number of image forming sheets contained in the received image forming instruction is determined to be less than a threshold value.

10. The method according to claim 9, wherein the selecting of an image forming device is based on the power consumption order when the number of image forming sheets contained in the received image forming instruction is determined to be equal to or more than the threshold value.

* * * * *